US012481516B2

(12) United States Patent
Ueda et al.

(10) Patent No.: US 12,481,516 B2
(45) Date of Patent: Nov. 25, 2025

(54) POWER CONVERSION DEVICE, POWER CONVERSION METHOD, AND POWER CONVERSION DEVICE MANUFACTURING METHOD

(71) Applicant: KABUSHIKI KAISHA YASKAWA DENKI, Fukuoka (JP)

(72) Inventors: Takeshi Ueda, Fukuoka (JP); Joji Ebisu, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 18/247,829

(22) PCT Filed: Oct. 9, 2020

(86) PCT No.: PCT/JP2020/038326
§ 371 (c)(1),
(2) Date: Apr. 4, 2023

(87) PCT Pub. No.: WO2022/074832
PCT Pub. Date: Apr. 14, 2022

(65) Prior Publication Data
US 2023/0376330 A1 Nov. 23, 2023

(51) Int. Cl.
*G05B 19/042* (2006.01)
*G06F 3/0482* (2013.01)
(Continued)

(52) U.S. Cl.
CPC ......... *G06F 9/453* (2018.02); *G05B 19/0426* (2013.01); *G06F 3/0482* (2013.01); *G06F 3/04847* (2013.01)

(58) Field of Classification Search
CPC .... G06F 9/453; G06F 3/0482; G06F 3/04847; G05B 19/0426
See application file for complete search history.

(56) References Cited

U.S. PATENT DOCUMENTS 6,285,917 B1 * 9/2001 Sekiguchi ............. H02J 3/0073
340/3.7
10,642,597 B2 * 5/2020 Lee .................... G05B 19/0426
(Continued)

FOREIGN PATENT DOCUMENTS

CN 110061609 A 7/2019
JP 2001-236214 A 8/2001
(Continued)

OTHER PUBLICATIONS

Notice of Reasons for Rejection issued in corresponding Japanese Patent Application No. 2022-555236, mailed Oct. 1, 2024, with partial translation (17 pages).
(Continued)

*Primary Examiner* — Tadesse Hailu
(74) *Attorney, Agent, or Firm* — Osha Bergman Watanabe & Burton LLP

(57) ABSTRACT

This power conversion device comprises: a power conversion circuit for converting primary side power to secondary side power; a program storage unit for storing a plurality of program modules and sequence data; an extension program acquiring unit for acquiring an extension program and storing the extension program into an extension program storage unit; and a control unit for sequentially calling and executing two or more modules to be executed from the plurality of program modules on the basis of the sequence data and controlling the power conversion circuit on the basis of an execution result. The plurality of program modules includes an extension module. When the called module to be executed is the extension module, the control unit executes the extension program by including the extension program in the extension program storage unit in the extension module.

18 Claims, 17 Drawing Sheets

(51) Int. Cl.
*G06F 3/04847* (2022.01)
*G06F 9/451* (2018.01)

(56) References Cited

U.S. PATENT DOCUMENTS

| | | | |
|---|---|---|---|
| 2004/0056665 A1* | 3/2004 | Iwanaga | G01R 19/16538 324/522 |
| 2016/0037668 A1* | 2/2016 | Yamanaka | H02J 3/381 361/679.01 |
| 2016/0322899 A1* | 11/2016 | Toujinbara | H02J 3/44 |
| 2016/0336792 A1* | 11/2016 | Terazono | H02J 3/32 |
| 2017/0047743 A1* | 2/2017 | Toujinbara | G05F 1/10 |
| 2018/0157483 A1 | 6/2018 | Lee et al. | |
| 2019/0179789 A1* | 6/2019 | Ohnuma | G06F 13/4081 |
| 2019/0229639 A1* | 7/2019 | Ueda | G06F 8/34 |
| 2021/0057989 A1* | 2/2021 | Jang | H04N 5/63 |

FOREIGN PATENT DOCUMENTS

| | | |
|---|---|---|
| JP | 2006-107172 A | 4/2006 |
| JP | 2007-034805 A | 2/2007 |
| JP | 2010-015533 A | 1/2010 |
| JP | 2010-22175 A | 1/2010 |
| JP | 2017-079007 A | 4/2017 |
| JP | 2019-106067 A | 6/2019 |
| JP | 2019-128930 A | 8/2019 |
| JP | 2020-012311 A | 1/2020 |
| JP | 2020-013211 A | 1/2020 |
| JP | 2020-067752 A | 4/2020 |

OTHER PUBLICATIONS

Office Action issued in corresponding Chinese Patent Application No. 202080105424.8, with partial English translation, dated Jun. 13, 2024, (10 pages).

Notice of Reasons for Refusal issued in corresponding Japanese Patent Application No. 2022-555236, mailed Mar. 4, 2025 (15 pages).

* cited by examiner

| PROGRAM MODULE | TERMINAL ID |
|---|---|
| STANDARD MODULE 1 | INPUT TERMINAL 1 OF BLOCK 1 |
| ... | ... |
| STANDARD MODULE 5 | OUTPUT TERMINAL 1 OF BLOCK 3 |
| EXTENSION MODULE | INPUT TERMINAL OF EXTENSION BLOCK |
| EXTENSION INPUT MODULE | INPUT TERMINAL OF EXTENSION INPUT BLOCK |
| EXTENSION OUTPUT MODULE | OUTPUT TERMINAL OF EXTENSION OUTPUT BLOCK |
| EXTENSION CHECK MODULE | OUTPUT TERMINAL OF EXTENSION BLOCK |

FIG. 2

| EXECUTION ORDER NO. | TERMINAL ID |
|---|---|
| 1 | ... |
| 2 | ... |
| 3 | ... |
| 4 | ... |
| 5 | ... |
| 6 | ... |
| ... | ... |

FIG. 3

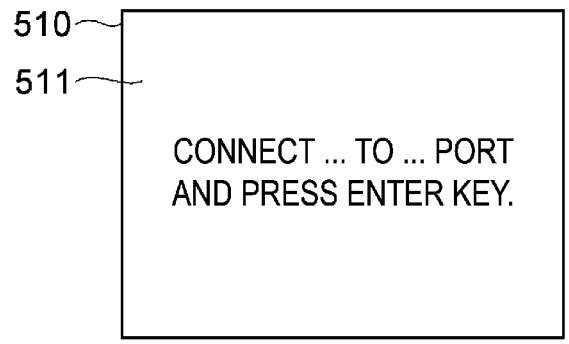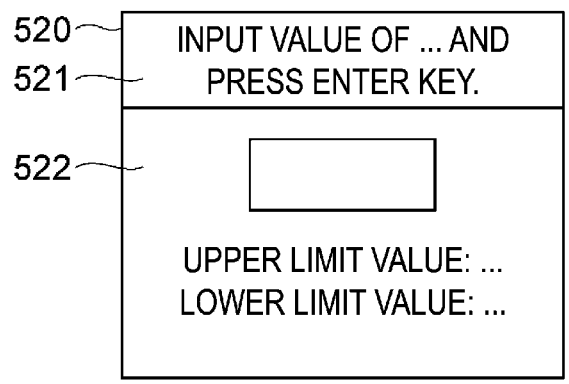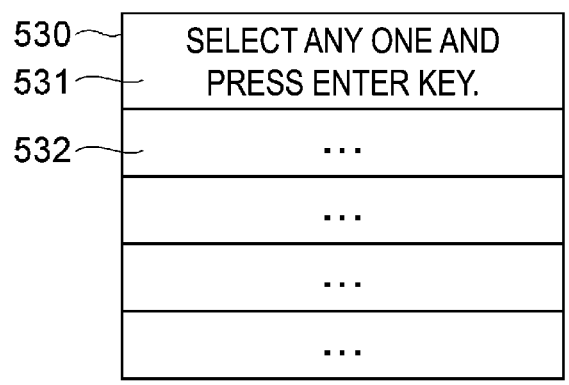
FIG. 7

POWER CONVERSION DEVICE, POWER CONVERSION METHOD, AND POWER CONVERSION DEVICE MANUFACTURING METHOD

TECHNICAL FIELD

The present disclosure relates to a power conversion device, a power conversion method, and a method of manufacturing a power conversion device.

BACKGROUND ART

Patent Document 1 discloses a power conversion device including a module holding unit that stores a plurality of program modules, a sequence holding unit that stores sequence data indicating an execution order of the plurality of program modules, and a control unit that controls a power conversion circuit in accordance with a control program including the plurality of program modules.

CITATION LIST

Patent Literature

Patent Document 1: JP 2019-128930 A

SUMMARY OF INVENTION

Technical Problem

An object of the present disclosure is to provide a power conversion device that is effective in achieving both easy programming and improved extensibility of the device.

Solution to Problem

A power conversion device according to one aspect of the present disclosure includes a power conversion circuit that converts primary power into secondary power, a program storage unit that stores a plurality of program modules and sequence data, an extension program acquisition unit that acquires an extension program and causes an extension program storage unit to store the extension program, and a control unit that sequentially calls and executes two or more execution target modules from the plurality of program modules, based on the sequence data, and controls the power conversion circuit, based on an execution result. The plurality of program modules include an extension module, and when an execution target module being called is the extension module, the control unit includes the extension program of the extension program storage unit into the extension module and executes the extension program.

A power conversion method according to another aspect of the present disclosure includes acquiring, among a plurality of program modules stored in a program storage unit, an extension program that determines a content of an extension module having an undetermined content, and causing an extension program storage unit to store the extension program, and sequentially calling and executing two or more execution target modules from the plurality of program modules, based on sequence data stored in the program storage unit, and controlling a power conversion circuit, based on an execution result. When an execution target module being called is the extension module, the extension program of the extension program storage unit is included into the extension module and executed.

A method of manufacturing a power conversion device according to still another aspect of the present disclosure includes generating, based on a source code, an extension program that determines a content of an extension module having an undetermined content, among a plurality of program modules stored in a power conversion device, generating sequence data of the plurality of program modules, based on a block diagram in which a plurality of function blocks respectively associated with the plurality of program modules are aligned and connected to each other, and storing the extension program and the sequence data in the power conversion device.

A method of manufacturing a power conversion device according to even still another aspect of the present disclosure includes generating, based on a source code, an extension program that determines a content of an extension module having an undetermined content, among a plurality of program modules stored in a power conversion device, and storing the extension program in an extension program storage unit that the power conversion device refers to when executing the extension module in a process of sequentially executing the plurality of program modules, based on sequence data determined in advance.

Advantageous Effects of Invention

According to the present disclosure, it is possible to provide a power conversion device that is effective in achieving both easy programming and improved extensibility of the device.

BRIEF DESCRIPTION OF DRAWINGS

FIG. 2 is a table showing an example of sequence data.

FIG. 3 is a table showing an example of a correspondence between program modules and terminals.

FIG. 7 is a schematic diagram illustrating an example of a base screen.

DESCRIPTION OF EMBODIMENTS

Hereinafter, embodiments will be described in detail with reference to the drawings. In the description, elements which are the same or have the same function are given the same reference signs, and redundant descriptions thereof are omitted.

Power Conversion System

A power conversion system 1 according to the present embodiment is a system that controls a load 92 by performing power conversion between a power source 91 and the load 92. A specific example of the load 92 is a motor of an electric motor device. Specific examples of the electric motor device include all types of devices driven by a motor, such as electric pumps, electric cranes, and elevators.

The motor may be a synchronous motor or an induction motor. Specific examples of the synchronous motor include a permanent magnet synchronous motor and a synchronous reluctance motor. Specific examples of the permanent magnet synchronous motor include a surface permanent magnet (SPM) motor and an interior permanent magnet (IPM) motor. The motor may be a direct current (DC) electric motor.

Figure 1:
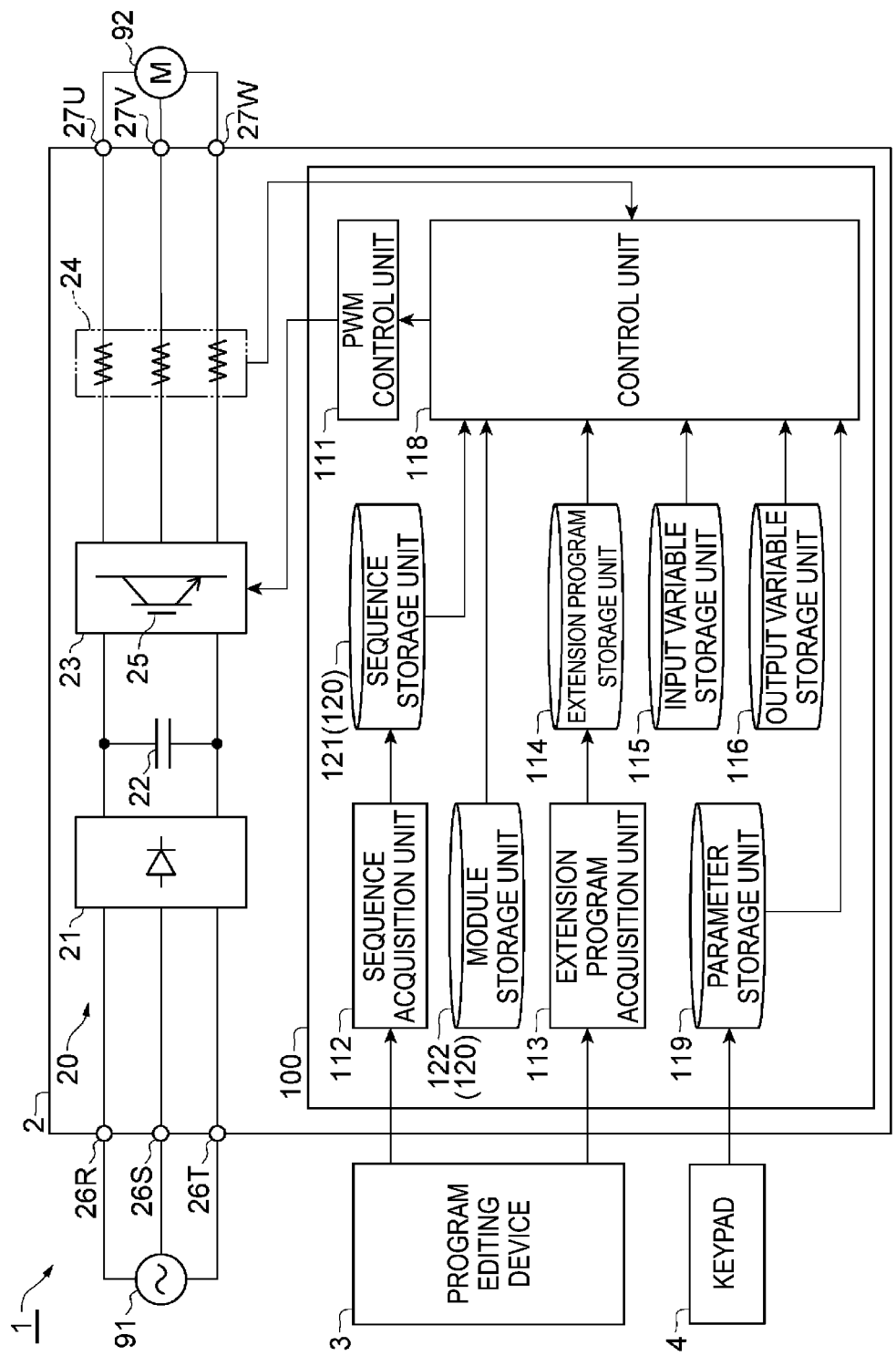
FIG. 1 is a schematic diagram illustrating an example of a configuration of a power conversion system.

As illustrated in FIG. 1, the power conversion system 1 includes a power conversion device 2, a program editing device 3, and a keypad 4. The power conversion device 2 converts power (primary power) from the power source 91 into driving power (secondary power) and supplies the secondary power to the load 92. The primary power and the secondary power may be alternating current power or may be direct current power. As an example, both the primary power and the secondary power are three-phase alternating current power.

The program editing device 3 is a computer used for editing a program in the power conversion device 2, and is connected to the power conversion device 2 as necessary.

The keypad 4 is a human machine interface (HMI) device used for various types of operation inputs to the power conversion device 2 such as setting of a control parameter, and includes a display device such as a liquid crystal monitor and an input device such as an input key set. The display device and the input device may be integrated as a so-called touch panel. Furthermore, the input device may be a voice input device such as a microphone.

The power conversion device 2 includes a power conversion circuit 20 and a control circuit 100. The power conversion circuit 20 converts primary power into secondary power by switching on and off a plurality of switching elements, and supplies the secondary power to the load 92. The power conversion circuit 20 is a voltage source inverter, for example, and applies a secondary voltage in accordance with a voltage command to the load 92.

For example, the power conversion circuit 20 includes power input terminals 26R, 26S, and 26T, power output terminals 27U, 27V, and 27W, a converter circuit 21, a smoothing capacitor 22, an inverter circuit 23, and a current sensor 24. The power input terminals 26R, 26S, and 26T are respectively connected to three phases (for example, an R-phase, an S-phase, and a T-phase) of the power source 91. The power output terminals 27U, 27V, and 27W are respectively connected to three phases (for example, a U-phase, a V-phase, and a W-phase) of the load 92.

The converter circuit 21, which is, for example, a diode bridge circuit or a PWM converter circuit, converts source power input to the power input terminals 26R, 26S, and 26T described above into direct current power. The smoothing capacitor 22 smooths the direct current power mentioned above.

The inverter circuit 23 converts the direct current power described above into the driving power mentioned above and outputs the driving power to the power output terminals 27U, 27V, and 27W. For example, the inverter circuit 23 includes a plurality of switching elements 25 and performs the above-described power conversion by switching on and off the plurality of switching elements 25. Each of the plurality of switching elements 25, which is, for example, a thyristor, a power metal oxide semiconductor field effect transistor (MOSFET), or an insulated gate bipolar transistor (IGBT), switches on and off in accordance with a gate drive signal.

The current sensor 24 detects a current flowing between the inverter circuit 23 and the power output terminals 27U, 27V, and 27W. For example, the current sensor 24 may be configured to detect currents of all phases (U-phase, V-phase, and W-phase) of a three-phase alternating current or may be configured to detect currents of any two phases of the three-phase alternating current. As long as no zero-phase current is generated, the sum of the currents of the U-phase, the V-phase, and the W-phase is zero, and information about the currents of all the phases is obtained, even when the currents of two phases are detected.

The configuration of the power conversion circuit 20 described above is merely an example and can be modified as appropriate as long as driving power can be supplied to the load 92. For example, the power conversion circuit 20 may be a current source inverter. The current source inverter outputs a drive current in accordance with a current command to the load 92. When the source power is direct current power, the power conversion circuit 20 need not include the converter circuit 21. When the power supplied to the load is direct current power, the power conversion circuit 20 may be a Thyristor-Leonard circuit. The power conversion circuit 20 may be a matrix converter circuit that bi-directionally converts power between the source power and the driving power without direct current conversion.

The control circuit 100 controls the power conversion circuit 20 such that driving power is supplied to the load 92. When, for example, the power conversion circuit 20 is a voltage source inverter, the control circuit 100 controls the power conversion circuit 20 such that a drive voltage in accordance with a voltage command is applied to the load 92. When the power conversion circuit 20 is a current source inverter, the control circuit 100 controls the power conversion circuit 20 such that a drive current in accordance with a current command is supplied to the load 92.

As described above, a basic function of the power conversion device 2 is to perform power conversion based on a command. However, depending on the application purpose and environment, the power conversion device 2 may be required to perform more sophisticated control. The required control varies greatly depending on the control target, and thus, it is desirable that a control program be easily editable in accordance with the control target. Therefore, the control program is divided into a plurality of program modules and sequence data representing an execution order of the program modules, and the program modules and the sequence data are stored in the power conversion device 2, so that the program can be easily edited by editing the sequence data. However, there may be a need for more sophisticated program editing that is not achieved by only editing the sequence data.

In response, the control circuit 100 is configured to: acquire, among a plurality of program modules stored in a program storage unit, an extension program that determines a content of an extension module having an undetermined content, and cause an extension program storage unit to store the extension program; and sequentially call and execute two or more execution target modules from the plurality of program modules, based on sequence data stored in the program storage unit, and control a power conversion circuit, based on an execution result. When a called execution target module is the extension module, the control circuit 100 is configured to include the extension program of the extension program storage unit into the extension module and execute the extension program.

According to this configuration, an execution target program is sequentially called and executed from the plurality of program modules in accordance with the sequence data, and when the extension module is called, the extension program in the extension program storage unit is executed as part of the extension module. Therefore, by changing the sequence of existing program modules, it is possible to easily incorporate a partially coded extension program into an easily creatable overall program. Therefore, both easy programming and improved extensibility of the device can be achieved.

An example of a configuration of the control circuit 100 in a case where the power conversion device 2 is a voltage source inverter device using a PWM method will be described in detail below. The control circuit 100 includes a PWM control unit 111, a program storage unit 120, a sequence acquisition unit 112, an extension program acquisition unit 113, an extension program storage unit 114, an input variable storage unit 115, an output variable storage unit 116, and a control unit 118.

The PWM control unit 111 controls the power conversion circuit 20 such that a secondary voltage according to a voltage command is applied to the load 92. For example, the PWM control unit 111 switches on and off each of the plurality of switching elements 25 in a control cycle of a carrier frequency and generates the secondary voltage corresponding to the voltage command according to a ratio of on and off periods of each switching element 25 in one cycle. A method of calculating the on and off periods of each switching element 25 is not limited to a particular method, and may be a well-known triangular wave comparison method, or may be a spatial vector modulation method. For example, the PWM control unit 111 switches on and off each switching element 25 by the output of the gate drive signal mentioned above.

The program storage unit 120 includes a module storage unit 122 that stores a plurality of program modules and a sequence storage unit 121 that stores the above-described sequence data. The plurality of program modules mentioned above are programs subdivided as constituent elements of the control program. A content of the control program can be changed by changing the execution order of the plurality of program modules. The module storage unit 122 may store a plurality of program modules in association with a plurality of function blocks defined in advance so that the content of the control program can be represented by an I/O relationship of information between two or more blocks.

Each of the plurality of function blocks schematically represents one group of processes including acquisition of calculation data, calculation based on the calculation data, and output of result data obtained by the calculation, as one block including an input terminal for the calculation data and an output terminal for the result data.

Among the plurality of function blocks, a function block that acquires calculation data from another function block includes an input terminal for acquiring the calculation data. On the other hand, a function block that directly acquires calculation data from a sensor or the like without using another function block does not include an input terminal for acquiring the calculation data. Among the plurality of function blocks, a function block that outputs result data to another function block includes an output terminal for outputting the result data. On the other hand, a function block that directly outputs result data to the PWM control unit 111 or the like without using another function block does not include the output terminal for outputting the result data. Therefore, the plurality of function blocks may include an input-type function block including only an input terminal, an output-type function block including only an output terminal, and an I/O-type function block including both the input terminal and the output terminal.

As illustrated in FIG. 2, the module storage unit 122 may store each of the plurality of program modules in association with any one terminal in the plurality of function blocks (one input terminal or one output terminal in any one function block). Hereinafter, a program module associated with an input terminal may be referred to as an "input program module", and a program module associated with an output terminal may be referred to as an "output program module". The above-described calculation operation of the function block may be incorporated in the input program module or may be incorporated in the output program module. A part of the above-described calculation operation may be incorporated in the input program module, and a remaining part of the above-described calculation operation may be incorporated in the output program module.

As shown in FIG. 2, the plurality of program modules include one or more standard modules, an extension module, an extension input module, an extension output module, and an extension check module.

The one or more standard modules are program modules that instruct execution of a process determined in advance, as a standard function of the power conversion device 2. The one or more standard modules may include an input standard module that is an input program module and an output standard module that is an output program module. Hereinafter, a function block in which a standard module is associated with at least an input terminal or an output terminal is referred to as a "standard block".

The extension module is a program module that instructs execution of the extension program mentioned above (an extension program in the extension program storage unit 114 described later). For example, the extension module is an input program module, and is associated with any input terminal of the plurality of function blocks. Hereinafter, a function block associated with the extension module is referred to as an "extension block". The extension module may be associated with an output terminal of the extension block.

The extension input module is a program module that stores result data output from another function block in an input variable (an input variable of the input variable storage unit 115 described later) referred to by the extension program. The extension input module is an input program module, and is associated with any input terminal of the plurality of function blocks. Hereinafter, a function block in which the extension input module is associated with an input terminal is referred to as an "extension input block".

The extension output module is a program module that reads an output variable (an output variable of the output variable storage unit 116 described later) in which data generated by execution of the extension program is stored and outputs the output variable to another function block. The extension output module is an output program module, and is associated with any output terminal of the plurality of function blocks. Hereinafter, a function block in which the extension output module is associated with an output terminal is referred to as an "extension output block".

The extension check module is a program module that outputs, to another function block, information of whether the extension program is executed without an error. For example, the extension check module is associated with an output terminal of the extension block described above.

Figure 3:
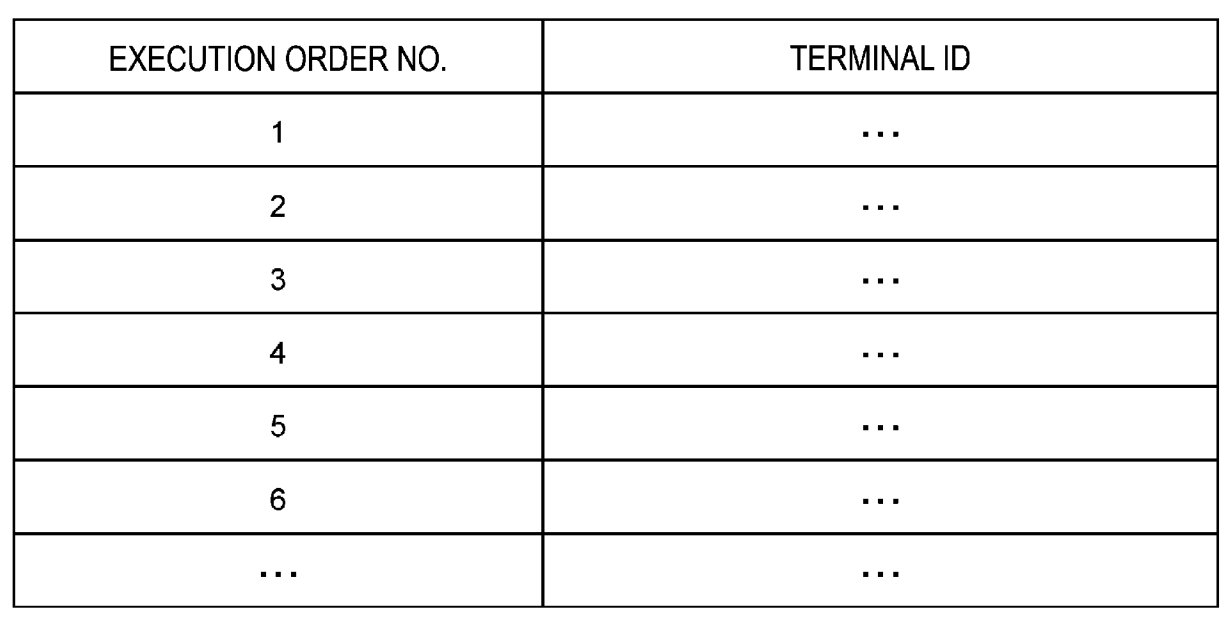

The sequence data stored in the sequence storage unit 121 is data that sets two or more program modules among the plurality of program modules as modules for configuring the control program (hereinafter, referred to as "execution target modules") and determines which execution target module is to be executed in each execution order. As described above, when each of the plurality of program modules is associated with any one terminal in the plurality of function blocks, identification information of the terminal may be determined in each execution order, as shown in FIG. 3. The sequence acquisition unit 112 acquires sequence data from the program editing device 3 and stores the sequence data in the sequence storage unit 121.

As described above, when a plurality of program modules are associated with a plurality of function blocks in the module storage unit 122, the program editing device 3 may generate sequence data, based on a block diagram in which the plurality of function blocks are aligned and connected to each other.

Figure 4:
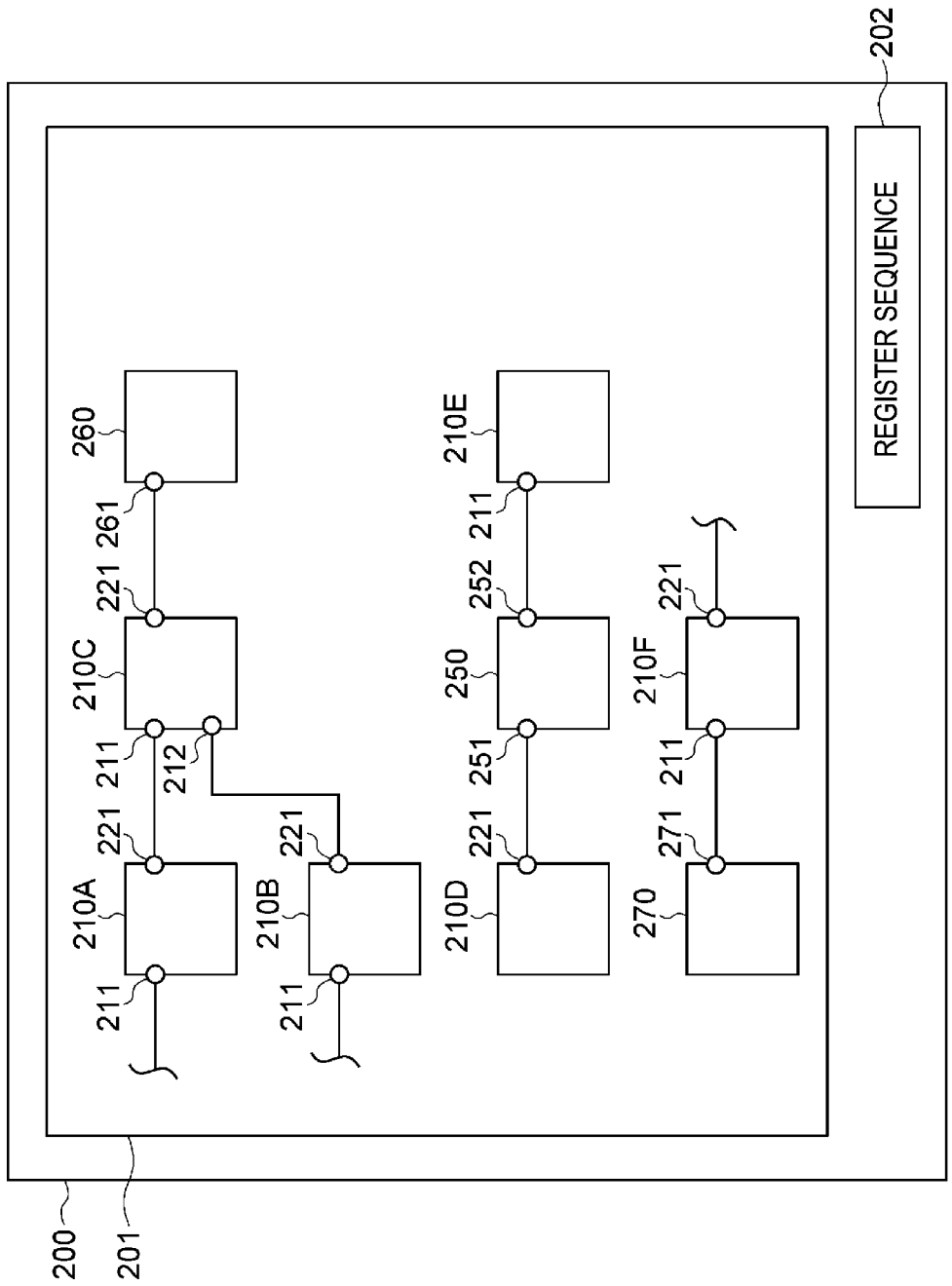
FIG. 4 is a schematic diagram illustrating an example of a user interface for generating sequence data.

For example, the program editing device 3 displays a sequence generation screen 200 illustrated in FIG. 4 on a display device such as a liquid crystal monitor. The sequence generation screen 200 includes a block window 201 and a sequence registration button 202.

The block window 201 is a window for creating the block diagram mentioned above by arranging and connecting a plurality of function blocks. The program editing device 3 arranges a function block specified by a user at a position specified by the user in the block window 201. Furthermore, an output terminal and an input terminal specified by the user in the block window 201 are connected by a link.

FIG. 4 illustrates a state where a block diagram including a plurality of standard blocks 210A, 210B, 210C, 210D, 210E, and 210F, an extension block 250, an extension input block 260, and an extension output block 270, is created.

The standard blocks 210A and 210B are I/O-type blocks, and each include an input terminal 211 and an output terminal 221. The standard block 210C is an I/O-type block, and includes two input terminals 211 and 212 and the output terminal 221.

The input terminals 211 of the standard blocks 210A and 210B are connected to output terminals of other standard blocks not illustrated. The output terminal 221 of the standard block 210A is connected to the input terminal 211 of the standard block 210C and the output terminal 221 of the standard block 210B is connected to the input terminal 212 of the standard block 210C. This indicates that processing results of the standard blocks 210A and 210B are input to the standard block 210C, and the standard block 210C performs a process, based on these processing results.

The output terminal 221 of the standard block 210C is connected to an input terminal 261 of the extension input block 260. This indicates that a processing result of the standard block 210 is input to the extension input block 260.

The extension input block 260 is, for example, an input-type block and includes the input terminal 261. As described above, the extension input block 260 is a block in which an extension input module is associated with the input terminal 261. Therefore, inputting a processing result of the standard block 210C to the extension input block 260 means storing the processing result of the standard block 210C in the input variable mentioned above.

The standard block 210D is an output-type block and includes the output terminal 221. For example, the standard block 210D outputs, to the output terminal 221, a determination result indicating whether a predetermined condition is satisfied. The output terminal 221 of the standard block 210D is connected to an input terminal 251 of the extension block 250. This indicates that a processing result of the standard block 210D is input to the extension block 250.

The extension block 250 is, for example, an I/O-type block, and includes the input terminal 251 and an output terminal 252. As described above, the extension block 250 is a block in which the extension module is associated with the input terminal 251 and the extension check module is associated with the output terminal 252. Thus, inputting the processing result of the standard block 210D to the extension block 250 means activating the extension program according to the processing result of the standard block 210D. The output terminal 252 of the extension block 250 is connected to the input terminal 211 of the standard block 210E. This indicates that an error check result by the extension check module is input to the standard block 210E.

The standard block 210E is an input-type block and includes the input terminal 211.

The standard block 210E causes a display device to display data input to the input terminal 211, for example.

The extension output block 270 is, for example, an output-type block and includes an output terminal 271. As described above, the extension output block 270 is a block in which an extension output module is associated with the output terminal 271.

The standard block 210F is an I/O-type block, and includes the input terminal 211 and the output terminal 221. The output terminal 271 of the extension output block 270 is connected to the input terminal 211 of the standard block 210F. This indicates that a processing result of the extension output block 270 (an output variable read by the extension output module) is input to the standard block 210F. The output terminal 221 of the standard block 210F is connected to an input terminal of another standard block not illustrated.

The sequence registration button 202 is a button used to instruct the generation and registration of sequence data, based on the block diagram of the block window 201. When the sequence registration button 202 is operated, the program editing device 3 generates sequence data, based on the block diagram of the block window 201. For example, the program editing device 3 generates the sequence data, based on an arrangement order of terminals along an information flow represented by a connection relationship between function blocks.

Note that an information flow from the standard block 210A to the input terminal 211 of the standard block 210C is parallel to an information flow from the standard block 210B to the input terminal 212 of the standard block 210C. Therefore, there is no order along the information flow between the terminal of the standard block 210A and the terminal of the standard block 210B. In such a case, the program editing device 3 determines the arrangement order of the terminals, based on the arrangement in the block window 201, for example. As an example, the program editing device 3 determines the arrangement order of the terminals so that, among a vertically arranged information flow, a lower information flow is executed after an upper information flow. According to this rule, the output terminal 221 of the standard block 210D is positioned after the input terminal 261 of the extension input block 260. The output terminal 271 of the extension output block 270 is positioned after the input terminal 211 of the standard block 210E.

The program editing device 3 transmits the sequence data generated as described above to the control circuit 100. The sequence data transmitted to the control circuit 100 is acquired by the sequence acquisition unit 112 and stored in the sequence storage unit 121.

Referring back to FIG. 1, the extension program acquisition unit 113 acquires the extension program from the program editing device 3 and stores the extension program in the extension program storage unit 114. For example, the extension program is an execution-type program expressed in a machine language that can be recognized by the control circuit 100.

Figure 5:
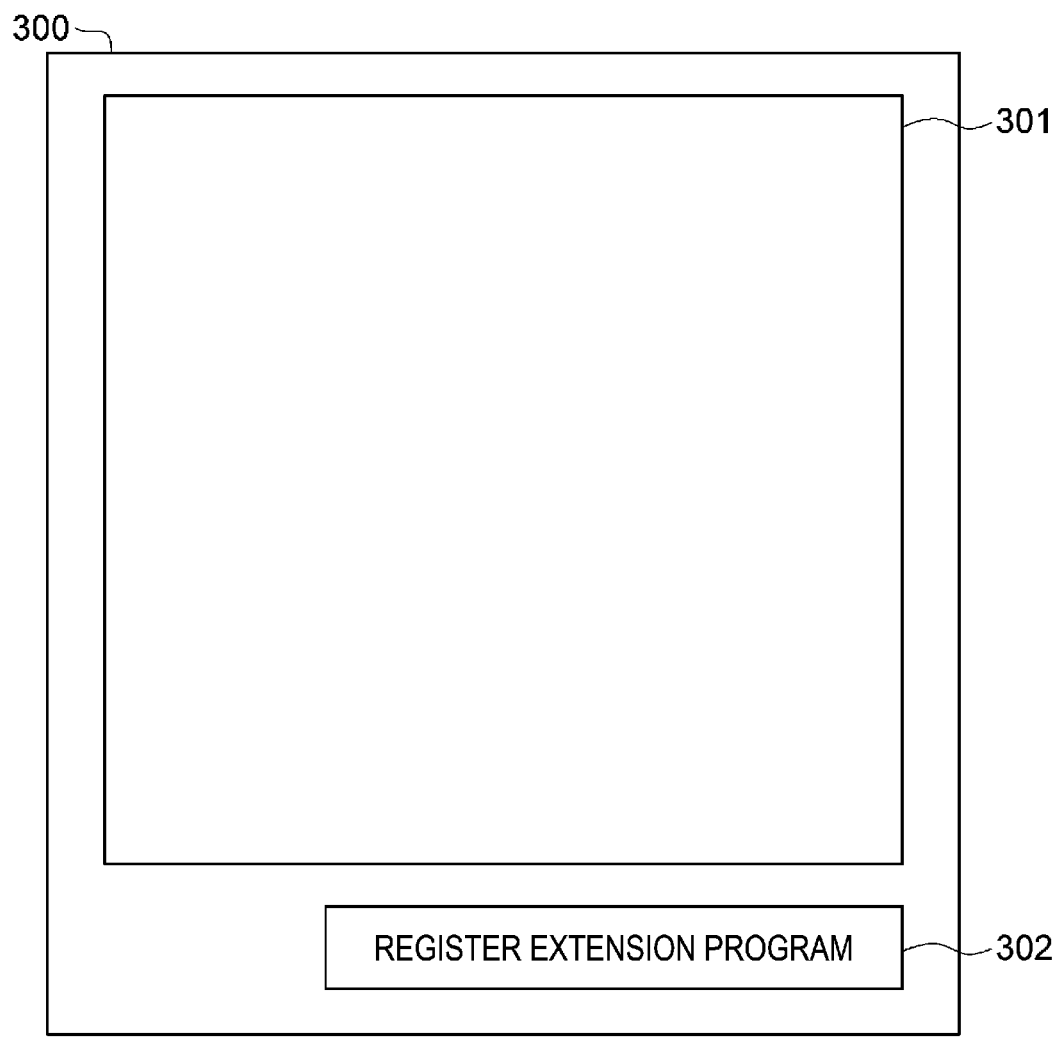
FIG. 5 is a schematic diagram illustrating an example of a user interface for generating an extension program.

The program editing device 3 may generate the extension program, based on a source code. For example, the program editing device 3 displays an extension program generation screen 300 illustrated in FIG. 5 on the display device. The extension program generation screen 300 includes a coding window 301 and an extension program registration button 302.

The coding window 301 is an edit window for displaying a source code input as a text by a user. The source code is expressed according to at least a coding rule that includes performing a calculation, based on the above-described input variable, and storing a calculation result in the above-described output variable.

The extension program registration button 302 is a button used to instruct the generation and registration of an extension program, based on the source code of the coding window 301. When the extension program registration button 302 is operated, the program editing device 3 converts the source code of the coding window 301 into the machine language mentioned above, to generate the extension program. The program editing device 3 transmits the generated extension program to the control circuit 100. The extension program transmitted to the control circuit 100 is acquired by the extension program acquisition unit 113 and stored in the extension program storage unit 114.

Referring back to FIG. 1, the input variable storage unit 115 stores the input variables described above. Data for this input variable is stored by the extension input module described above. The input variable storage unit 115 may store a plurality of input variables. In this case, it is possible to register an extension program that performs calculation based on the plurality of input variables. When the input variable storage unit 115 stores a plurality of input variables, the module storage unit 122 may store a plurality of extension input modules each corresponding to a respective one of the plurality of input variables. Each of the plurality of extension input modules may be associated with a corresponding one of the plurality of extension input blocks.

The output variable storage unit 116 stores the above-described output variable. Data generated when the above-described extension program is executed is stored for the output variable. The output variable storage unit 116 may store a plurality of output variables. In this case, a plurality of types of numerical values generated by the extension program in a calculation process can be stored in a plurality of output variables and utilized. When the output variable storage unit 116 stores a plurality of output variables, the module storage unit 122 may store a plurality of extension output modules each corresponding to a respective one of the plurality of output variables. Each of the plurality of extension output modules may be associated with a corresponding one of the plurality of extension output blocks.

The control unit 118 sequentially calls and executes the two or more execution target modules in the module storage unit 122 one by one, based on the sequence data of the sequence storage unit 121, and controls the power conversion circuit 20, based on an execution result. For example, the control unit 118 controls the power conversion circuit 20, based on a series of execution results of two or more execution target modules. For example, the control unit 118 generates a voltage command, based on the series of execution results mentioned above, and outputs the generated voltage command to the PWM control unit 111. Thus, the power conversion circuit 20 is controlled, based on the series of execution results described above.

When a called execution target module is the extension input module, the control unit 118 acquires input data and stores the input data in an input variable of the input variable storage unit 115. For example, the control unit 118 acquires an execution result of the output standard module executed immediately before the acquisition and stores the execution result in the input variable of the input variable storage unit 115.

When a called execution target module is the extension module, the control unit 118 includes the extension program of the extension program storage unit 114 into the extension module and executes the extension program. As described above, the extension module is a program module that instructs execution of the extension program in the extension program storage unit 114. Therefore, the execution of the extension module includes the execution of the extension program. For example, the control unit 118 executes the extension program, based on the input variable of the input variable storage unit 115. Furthermore, the control unit 118 stores, in the output variable of the output variable storage unit 116, output data obtained by executing the extension program. When a called execution target module is the extension output module, the control unit 118 reads the output variable of the output variable storage unit 116. The control unit 118 causes an input standard module that is to be executed immediately after the output variable is read, to acquire the read output variable.

The control unit 118 executes the two or more execution target modules in an order determined by the sequence data and controls the power conversion circuit 20, based on a series of execution results, to repeatedly perform control at a predetermined control period.

The control circuit 100 may further include a parameter storage unit 119. The parameter storage unit 119 stores one or more control parameters set by using the keypad 4. Specific examples of the control parameters include numerical parameters such as various types of control gains and filter time constants. The control parameter may be ON/OFF for feedforward control, or may be a mode number specifying any one of a plurality of types of control modes. The control parameter may be a type number specifying the type of motor to be controlled.

When the control circuit 100 further includes the parameter storage unit 119, the control unit 118 may control the power conversion circuit 20, further based on one or more control parameters stored in the parameter storage unit 119. For example, the control unit 118 may execute at least any one of a plurality of program modules, based on the one or more control parameters stored in the parameter storage unit 119.

When the control unit 118 controls the power conversion circuit 20, based on the one or more control parameters, it is necessary to appropriately set the one or more control parameters by the keypad 4, before the control unit 118 controls the power conversion circuit 20. It is of course also necessary to appropriately set up hardware such as connection wiring between devices. In order to promote the reliable execution of these operations, it is effective to add, to the power conversion device 2, a wizard function for guiding an appropriate operation input by a dialogue function.

However, a user operation procedure required for initial setting, troubleshooting, or the like of the power conversion device may vary depending on the content of the entire program. When the user operation procedure changes, it is necessary to change a content of the wizard for guiding the operation input.

In response, the control circuit 100 may be further configured to: acquire a plurality of screen objects determining each of a display content of a wizard screen for guiding an operation input and a processing content corresponding to an operation input in accordance with a guidance, and cause a screen object storage unit to store the plurality of screen objects; and select a screen object to be displayed from the plurality of screen objects in the screen object storage unit, based on an actual operation input, and display a wizard screen, based on the screen object to be displayed. Thus, a content of the wizard can be easily changed in accordance with a change of the content of the entire program.

Figure 6:
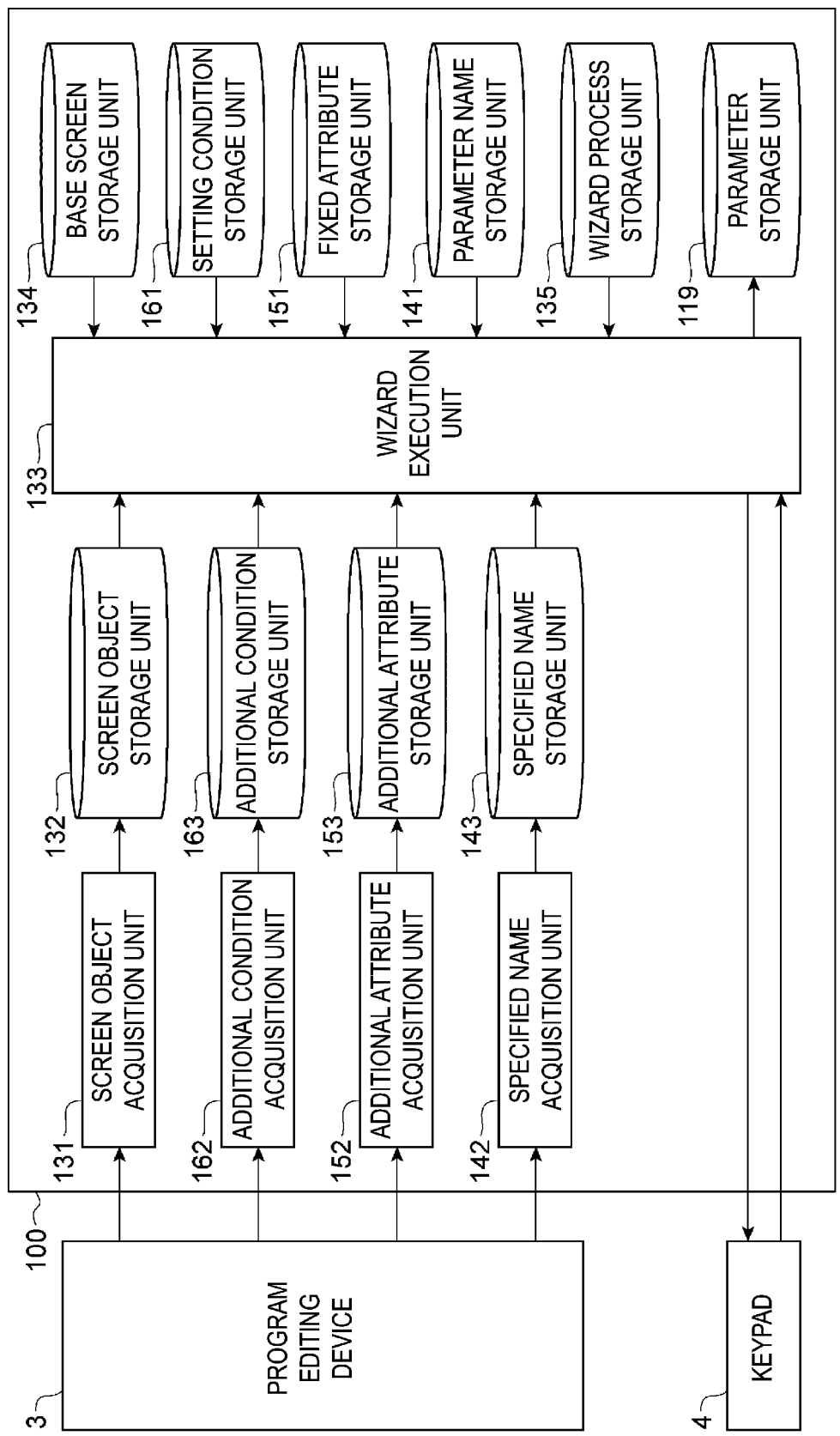
FIG. 6 is a schematic diagram illustrating a modified example of the power conversion device.

For example, as illustrated in FIG. 6, the control circuit 100 may further include a screen object acquisition unit 131, a screen object storage unit 132, and a wizard execution unit 133.

The screen object acquisition unit 131 acquires a plurality of screen objects determining each of a display content of the wizard screen and a processing content corresponding to an operation input in accordance with a guidance, and causes the screen object storage unit 132 to store the plurality of screen objects. For example, each of the plurality of screen objects associates a predetermined operation input with one or more pieces of processing content.

The one or more pieces of processing content in each of the plurality of screen objects include at least a screen transition process. The screen transition process is a process causing a transition of the wizard screen. A specific example of the screen transition process includes a process of causing a wizard screen based on an object of the wizard screen to transition to a wizard screen based on a screen object of a transition destination determined in advance. A process of closing the wizard screen based on the object of the wizard screen, to complete the wizard process, also corresponds to a transition into a state where the wizard screen is not displayed, and thus, is included in the screen transition process. Such a screen transition process having no transition destination may be referred to as a "final screen transition process" hereinafter.

The wizard execution unit 133 selects a screen object to be displayed from a plurality of screen objects in the screen object storage unit 132, based on an actual operation input, and displays a wizard screen, based on the screen object to be displayed. For example, the wizard execution unit 133 selects, from a plurality of screen objects, a screen object to be displayed first, in accordance with an operation input instructing a start of the wizard. For example, the wizard execution unit 133 selects a screen object to be displayed first, based on an initial selection condition determined in advance. Specific examples of the initial selection condition are indicated below.

Example 1) Select a screen object indicated by predetermined identification information.

Example 2) Select a screen object having the most recent identification number.

When the actual operation input is associated with a screen transition process of the screen object being the current display target, the wizard execution unit 133 selects, from the plurality of screen objects, based on the screen transition process, a screen object to be displayed next and causes the current wizard screen to transition to a wizard screen based on the screen object to be displayed next. When the screen transition process is the last screen transition process mentioned above, the wizard execution unit 133 closes the current wizard screen to complete the wizard process.

In order to further facilitate the creation of a screen object, the control circuit 100 may be configured to create and display, on a base screen prepared in advance, a display content based on the screen object. The control circuit 100 may further include a base screen storage unit 134, for example.

The base screen storage unit 134 stores a base screen prepared in advance. For example, the base screen storage unit 134 stores data determining a shape, a size, a layout within the screen, and the like of the base screen. In this case, the wizard execution unit 133 creates, in the base screen of the base screen storage unit 134, the display content based on the screen object to be displayed, to display the wizard screen.

The base screen storage unit 134 may store a plurality of base screens. In this case, each of the plurality of screen objects includes base specification data specifying any one of the plurality of base screens and content data specifying a content to be created in the specified base screen. The wizard execution unit 133 selects any one of the plurality of base screens, based on the base specification data of a screen object to be displayed, and creates, in a selected base screen, a display content specified by the content data of the screen object to be displayed, to display a wizard screen.

Each of the plurality of base screens may include a message region for displaying a message to a user, and the content data of each of the plurality of screen objects may include message data determining the message to the user. In this case, the wizard execution unit 133 creates, in the message region of the selected base screen, a message determined by the message data of the screen object to be displayed, to display a wizard screen.

The message data may be any piece of data by which a message can be displayed, and may be, for example, image data or text data. Specific examples of the plurality of base screens stored in the base screen storage unit 134 include a message display screen 510, a parameter setting screen 520, and a menu selection screen 530 illustrated in FIG. 7.

The message display screen 510 is a screen for displaying a message to a user. The message display screen 510 includes a message region 511. The plurality of screen objects may include a message object in which the base specification data specifies the message display screen 510. The content data of the message object includes the message data mentioned above. When the screen object to be displayed is a message object, the wizard execution unit 133 selects the message display screen 510, based on the base specification data, and creates, in the message region 511 of the message display screen 510, a message determined by the message data, to display a wizard screen. As an example, a state is illustrated where the message display screen 510 illustrated in FIG. 7 has, created in the message region 511, a message demanding a user to connect a specified device to any one of I/O ports of the power conversion device 2 and press an Enter key.

The parameter setting screen 520 includes a message region 521 and a parameter setting region 522. The plurality of screen objects may include a parameter setting object in which the base specification data specifies the parameter setting screen 520. The content data of the parameter setting object includes the message data described above and parameter specification data. The parameter specification data is data specifying any one of the one or more control parameters.

When a screen object to be displayed is a parameter setting object, the wizard execution unit 133 selects the parameter setting screen 520, based on the base specification data, and creates, in the message region 521 of the parameter setting screen 520, a message determined by the message data. Furthermore, the wizard execution unit 133 creates, in the parameter setting region 522, a setting portion of a control parameter specified by the parameter specification data to display a wizard screen. For example, based on an input condition of the control parameter specified by the parameter specification data, the wizard execution unit 133 generates an input form of the parameter and creates, in the parameter setting region 522, a setting portion including the generated input form.

A specific example of the input condition includes inputting a numerical value in a range having a predetermined lower limit value and upper limit value. In this case, the wizard execution unit 133 generates an input form in which, for example, a message indicating the lower limit value and the upper limit value and a numerical value input field are aligned. Another example of the input condition is a condition in which an initial value determined in advance is input, unless the user specifies a value. In this case, the wizard execution unit 133 generates an input form in which an initial value is set in the numerical value input field in advance. Still another example of the input condition includes a condition in which any one of options determined in advance is input. In this case, the wizard execution unit 133 generates an input form for selecting the options determined in advance.

As an example, a state is illustrated where the parameter setting screen 520 illustrated in FIG. 7 has, created in the message region 521, a message demanding a user to input a value of a certain parameter and press an Enter key, and has, created in the parameter setting region 522, a setting portion including an input form in which a numerical value input field of the parameter and a message indicating a lower limit value and an upper limit value of the parameter are aligned.

The menu selection screen 530 includes a message region 531 and a menu selection region 532. The plurality of screen objects may include a menu selection object in which the base specification data specifies the menu selection screen 530. Content data of the menu selection object includes the message data described above and item data.

The item data is data that determines one or more items to be presented to the user as options. The item data may determine each item in any data format, as long as the content of each item can be displayed. For example, the item data may determine each item as image data or text data.

When a screen object to be displayed is a menu selection object, the wizard execution unit 133 selects the menu selection screen 530, based on the base specification data, and creates, in the message region 531 of the menu selection screen 530, a message determined by the message data. Furthermore, the wizard execution unit 133 creates, in the menu selection region 532, one or more items specified by the item data, to display the wizard screen. As an example, a state is illustrated where the menu selection screen 530 illustrated in FIG. 7 has, created in the menu selection region 532, four items that are vertically aligned, and has, created in the message region 531, a message demanding a user to select any of the four items and press an Enter key.

In order to facilitate the expression of the processing contents when creating the screen object, the control circuit 100 may be configured to execute a process specified in the screen object among one or more wizard processes prepared in advance. The control circuit 100 may further include a wizard process storage unit 135, for example. The wizard process storage unit 135 stores one or more wizard processes prepared in advance.

At least any one of the plurality of screen objects may further include process specification data in which the operation input in accordance with the guidance is associated with at least any one wizard process of the one or more wizard processes. When the screen object to be displayed includes the process specification data, the wizard execution unit 133 executes any one of the one or more wizard processes, based on an actual operation input and the process specification data. For example, the one or more wizard processes include a screen transition process of causing the current wizard screen to transition to a wizard screen based on any one of the plurality of screen objects.

At least one of the plurality of screen objects may include, as the process specification data, screen transition specification data in which the operation input in accordance with the guidance is associated with the screen transition process. When the screen object to be displayed includes the screen transition specification data, the wizard execution unit 133 executes the screen transition process, based on the actual operation input and the screen transition specification data.

Figure 8:
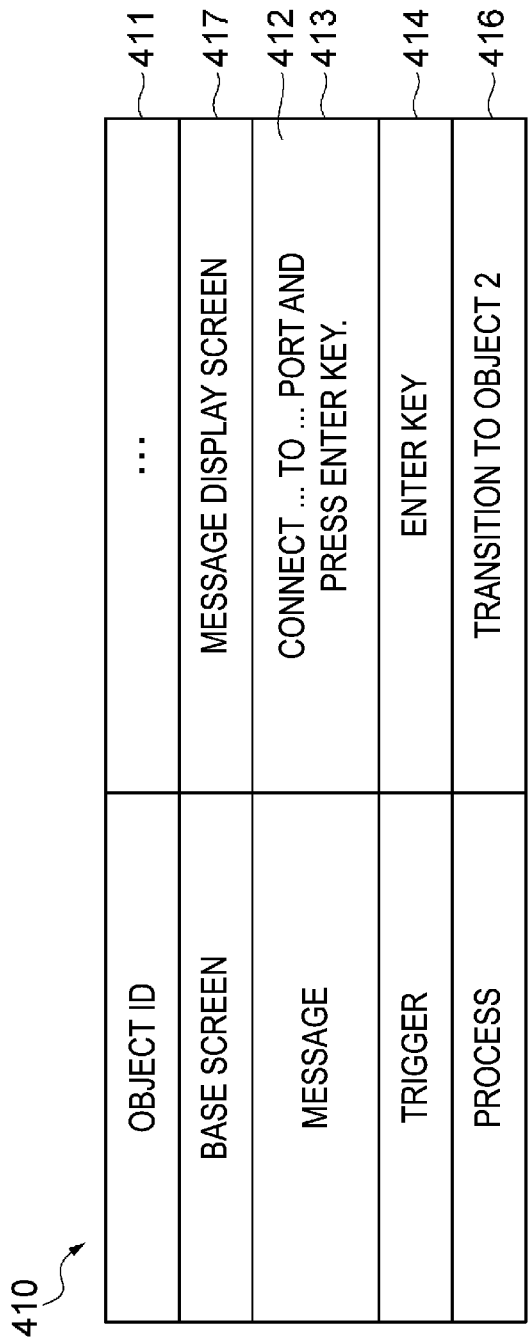
FIG. 8 is a table showing an example of a message display object.

FIG. 8 is a table showing an example of a message object including the screen transition specification data. A message object 410 illustrated in FIG. 8 includes an object ID 411, base specification data 417, content data 413, trigger specification data 414, and screen transition specification data 416.

The object ID 411 is identification information (for example, an identification number) of the message object 410. The base specification data 417 is data specifying any one of the plurality of base screens as described above, and specifies the message display screen 510. The content data 413 is data specifying a content to be created in the message display screen 510 as described above, and includes message data 412. The message data 412 is data specifying a message to be created in the message region 521 as described above.

The trigger specification data 414 is data specifying an operation input serving as a trigger for a process. In the illustrated example, an operation on an Enter key is specified. The screen transition specification data 416 specifies, as a wizard process corresponding to the operation input specified by the trigger specification data 414, a transition to a wizard screen based on any one of the plurality of screen objects. In the illustrated example, a transition to a wizard screen based on a screen object having an object ID "object 2" is specified.

When the screen object to be displayed is the message object 410, the wizard execution unit 133 displays a wizard screen in which a message specified by the message data 412 is created in the message region 511 of the message display screen 510 specified by the base specification data 417. When an Enter key specified by the trigger specification data 414 is pressed, the wizard execution unit 133 executes a transition to a wizard screen based on the "object 2" specified by the screen transition specification data 416.

The one or more wizard processes may include a parameter change process of changing a control parameter, based on an input content to a setting portion of the control parameter in the parameter setting region. The parameter setting object may include change process specification data in which the operation input in accordance with the guidance is associated with the parameter change process. When a screen object to be displayed is a parameter setting object, the wizard execution unit 133 executes the parameter change process, based on the actual operation input and the change process specification data.

Figure 9:
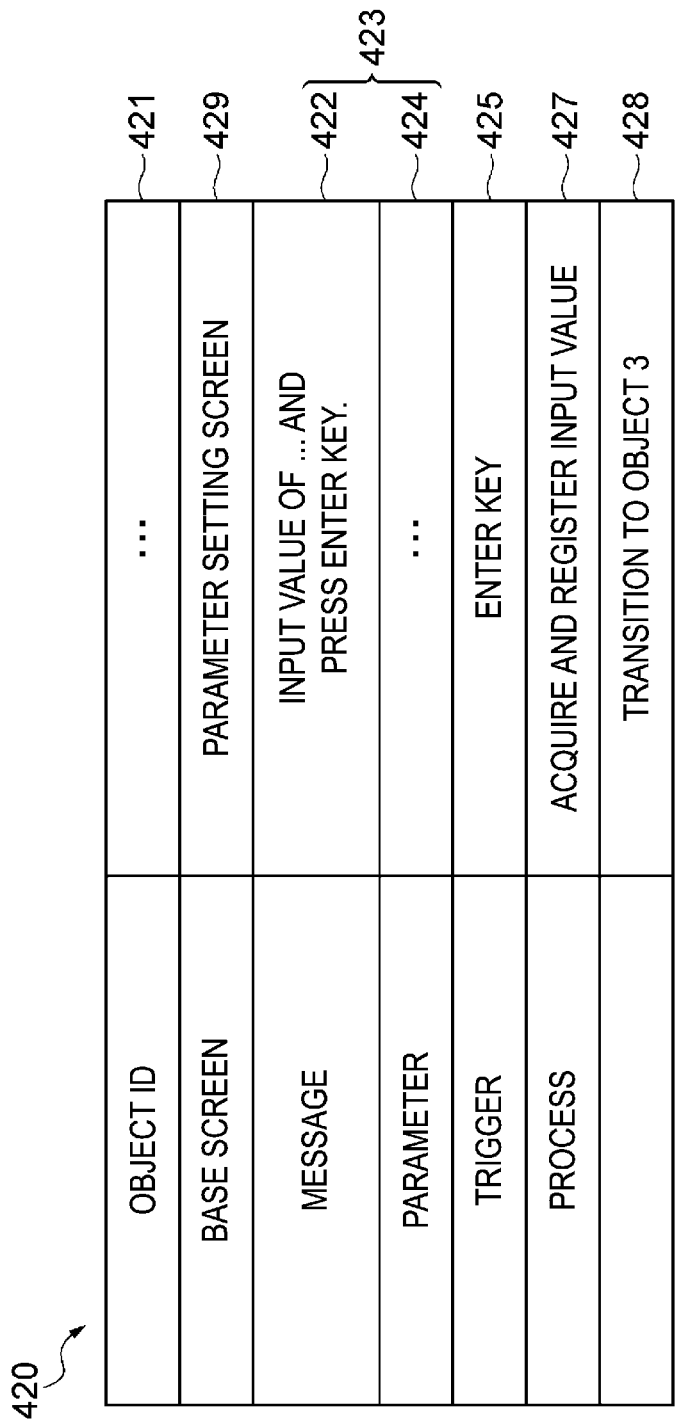
FIG. 9 is a table showing an example of a parameter setting object.

FIG. 9 is a table showing an example of a parameter setting object including the change process specification data. A parameter setting object 420 illustrated in FIG. 9 includes an object ID 421, base specification data 429, content data 423, trigger specification data 425, change process specification data 427, and screen transition specification data 428. The object ID 421 is identification information (for example, an identification number) of the parameter setting object 420. The base specification data 429 is data specifying any one of the plurality of base screens as described above, and specifies the parameter setting screen 520.

As described above, the content data 423 is data specifying a content to be created in the parameter setting screen 520, and includes message data 422 and parameter specification data 424. The message data 422 is data specifying a message to be created in the message region 521 as described above. The parameter specification data 424 is data specifying any one of the one or more control parameters as described above.

The trigger specification data 425 is data specifying an operation input serving as a trigger for a process. In the illustrated example, an operation on an Enter key is specified. The change process specification data 427 specifies, as a wizard process corresponding to an operation input specified by the trigger specification data 425, a process of acquiring a value input to the parameter setting region 522 to change the control parameter. The screen transition specification data 428 specifies, as a wizard process corresponding to an operation input specified by the trigger specification data 425, a transition to a wizard screen, based on any one of the plurality of screen objects. In the illustrated example, a transition to a wizard screen based on a screen object having an object ID "object 3" is specified.

When the screen object to be displayed is the parameter setting object 420, the wizard execution unit 133 creates, in the message region 521 of the parameter setting screen 520 specified by the base specification data 429, a message specified by the message data 422. The wizard execution unit 133 creates, in the message region 521 of the parameter setting screen 520, a setting portion of the control parameter specified by the parameter specification data 424, to display the wizard screen.

When an Enter key specified by the trigger specification data 425 is pressed, the wizard execution unit 133 sequentially executes the parameter change process specified by the change process specification data 427 and the screen transition process specified by the screen transition specification data 428. For example, the wizard execution unit 133 acquires a value input to the parameter setting region 522, changes the value of the control parameter specified by the parameter specification data 424 to the acquired input value, and stores a result of the change in the parameter storage unit 119. When an input value for a control parameter having a determined upper limit value exceeds the upper limit value, the wizard execution unit 133 may change the value of the control parameter to the upper limit value. When an input value for a control parameter having a determined lower limit value is lower than the lower limit value, the wizard execution unit 133 may change the value of the control parameter to the lower limit value. Subsequently, the wizard execution unit 133 executes transition to a wizard screen based on the "object 3" specified by the screen transition specification data 428.

The menu selection object may further include item correspondence data associating the one or more items with any one of the one or more wizard processes. When the screen object to be displayed is a menu selection object, the wizard execution unit 133 executes any one of the one or more wizard processes, based on an item selected in the menu selection region and the item correspondence data.

Figure 10:
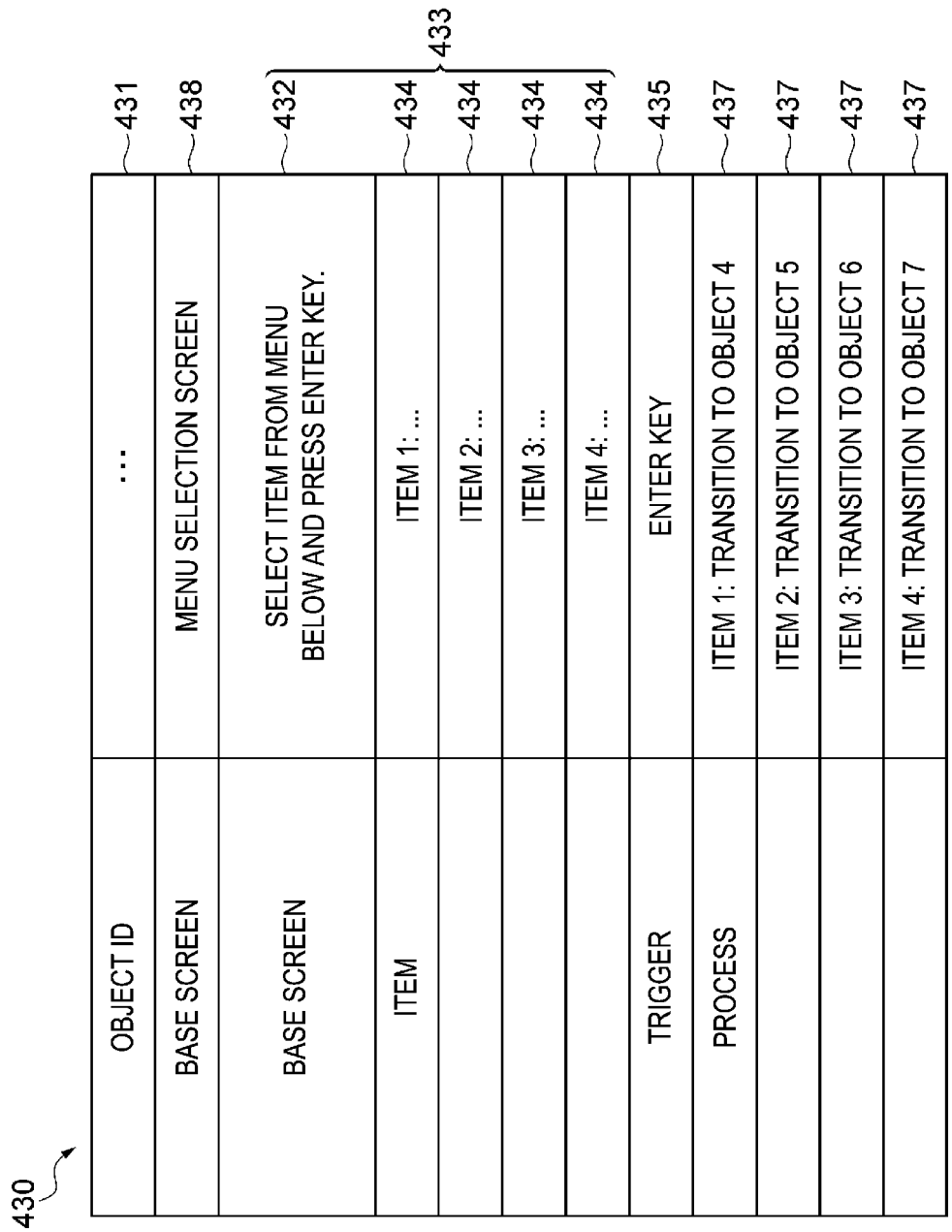
FIG. 10 is a table showing an example of a menu selection object.

FIG. 10 is a table showing an example of a menu selection object including item correspondence data. A menu selection object 430 illustrated in FIG. 10 includes an object ID 431, base specification data 438, content data 433, trigger specification data 435, and item correspondence data 437.

The object ID 431 is identification information (for example, an identification number) of the parameter setting object 420. The base specification data 438 is data specifying any one of the plurality of base screens as described above, and specifies the menu selection screen 530.

As described above, the content data 433 is data specifying a content to be created in the menu selection screen 530, and includes message data 432 and item data 434. The message data 432 is data specifying a message to be created in the message region 531 as described above. As described above, the item data 434 is data that determines one or more items to be presented to the user as options. In the illustrated example, four items are determined. The trigger specification data 435 is data specifying an operation input serving as a trigger for a process. In the illustrated example, an operation on an Enter key is specified.

The item correspondence data 437 associates any one of one or more wizard processes with one or more items determined by the item data 434. In the illustrated example, a transition to a wizard screen based on a screen object having an object ID "object 4" is associated with item 1. A transition to a wizard screen based on a screen object having an object ID "object 5" is associated with item 2. A transition to a wizard screen based on a screen object having an object ID "object 6" is associated with item 3. A transition to a wizard screen based on a screen object having an object ID "object 7" is associated with item 4.

When an Enter key specified by the trigger specification data 435 is pressed, processes associated with each item by the item correspondence data 437 are executed. Therefore, in the menu selection object 430, the item correspondence data 437 is also an example of the above-described process specification data.

When the screen object to be displayed is the menu selection object 430, the wizard execution unit 133 creates, in the message region 531 of the menu selection screen 530 specified by the base specification data 438, a message specified by the message data 432. Furthermore, the wizard execution unit 133 creates, in the menu selection region 532 of the menu selection screen 530, one or more items determined by the item data 434, to display the wizard screen.

When an Enter key specified by the trigger specification data 435 is pressed, the wizard execution unit 133 selects the item selected in the menu selection region 532. Hereinafter, an item selected at this timing is referred to as a "selected item".

The wizard execution unit 133 executes a wizard process associated with the selected item in the item data 434. For example, when the selected item is "item 1", the wizard execution unit 133 executes a transition to a wizard screen based on "object 4". When the selected item is "item 2", the wizard execution unit 133 executes a transition to a wizard screen based on "object 5". When the selected item is "item 3", the wizard execution unit 133 executes a transition to a wizard screen based on "object 6". When the selected item is "item 4", the wizard execution unit 133 executes a transition to a wizard screen based on "object 7".

The control circuit 100 may be configured to create, in the parameter setting region 522, a name determined in advance for each of the one or more control parameters, or may be configured to change the name to be created in the parameter setting region 522 for each of the one or more control parameters. For example, as illustrated in FIG. 6, the control circuit 100 may further include a parameter name storage unit 141, a specified name acquisition unit 142, and a specified name storage unit 143.

The parameter name storage unit 141 stores a name determined in advance for each of the one or more control parameters. Hereinafter, a name stored in the parameter name storage unit 141 may be referred to as an "initial name". The specified name acquisition unit 142 acquires name specification data specifying a user-specified name in any one of the one or more control parameters and stores the name specification data in the specified name storage unit 143.

When the name specification data for a control parameter specified by the parameter specification data 424 is stored in the specified name storage unit 143, the wizard execution unit 133 may create the user-specified name in the parameter setting region 522, and when the name specification data for the control parameter is not stored in the specified name storage unit 143, the wizard execution unit 133 may create an initial name in the parameter setting region 522.

The control circuit 100 may be configured to create, in the parameter setting region 522, an attribute determined in advance for each of the one or more control parameters. Here, the attribute of a parameter refers to, for example, any physical quantity used in a control process as a value expressed by any unit.

The one or more control parameters may include a fixed attribute parameter having an attribute that is unchangeable, and a free parameter having an attribute that is changeable. A specific example of the fixed attribute parameter is a parameter that is already used in the standard module, assuming that an attribute is determined in advance. A specific example of the free parameter is a parameter that is not used in the standard module.

The control circuit 100 may be configured to change an attribute of the free parameter. For example, the control circuit 100 may further include a fixed attribute storage unit 151, an additional attribute acquisition unit 152, and an additional attribute storage unit 153. The fixed attribute storage unit 151 stores an attribute of the fixed attribute parameter. The additional attribute acquisition unit 152 acquires attribute specification data specifying an attribute of the free parameter and stores the attribute specification data in the additional attribute storage unit 153.

When the control parameter specified by the parameter specification data 424 is a fixed attribute parameter, the wizard execution unit 133 creates, in the parameter setting region 522, a display of the attribute stored in the fixed attribute storage unit 151. Furthermore, when the control parameter specified by the parameter specification data 424 is a free parameter, the wizard execution unit 133 creates, in the parameter setting region 522, a display of the attribute stored in the additional attribute storage unit 153.

The control circuit 100 may be configured to change the above-described input condition for each of the one or more control parameters. For example, the control circuit 100 may further include a setting condition storage unit 161, an additional condition acquisition unit 162, and an additional condition storage unit 163.

The setting condition storage unit 161 stores an input condition determined in advance for each of the one or more control parameters. Hereinafter, the input condition stored in the setting condition storage unit 161 may be referred to as an "initial input condition". The additional condition acquisition unit 162 acquires input condition specification data specifying an input condition for any one of the one or more control parameters and stores the input condition specification data in the additional condition storage unit 163.

When the input condition specification data for a control parameter specified by the parameter specification data 424 is stored in the additional condition storage unit 163, the wizard execution unit 133 generates the input form mentioned above, based on an input condition specified by the input condition specification data. When the input condition specification data for the control parameter specified by the parameter specification data 424 is not stored in the additional condition storage unit 163, the wizard execution unit 133 generates the above-described input form, based on the initial input condition.

Figure 11:
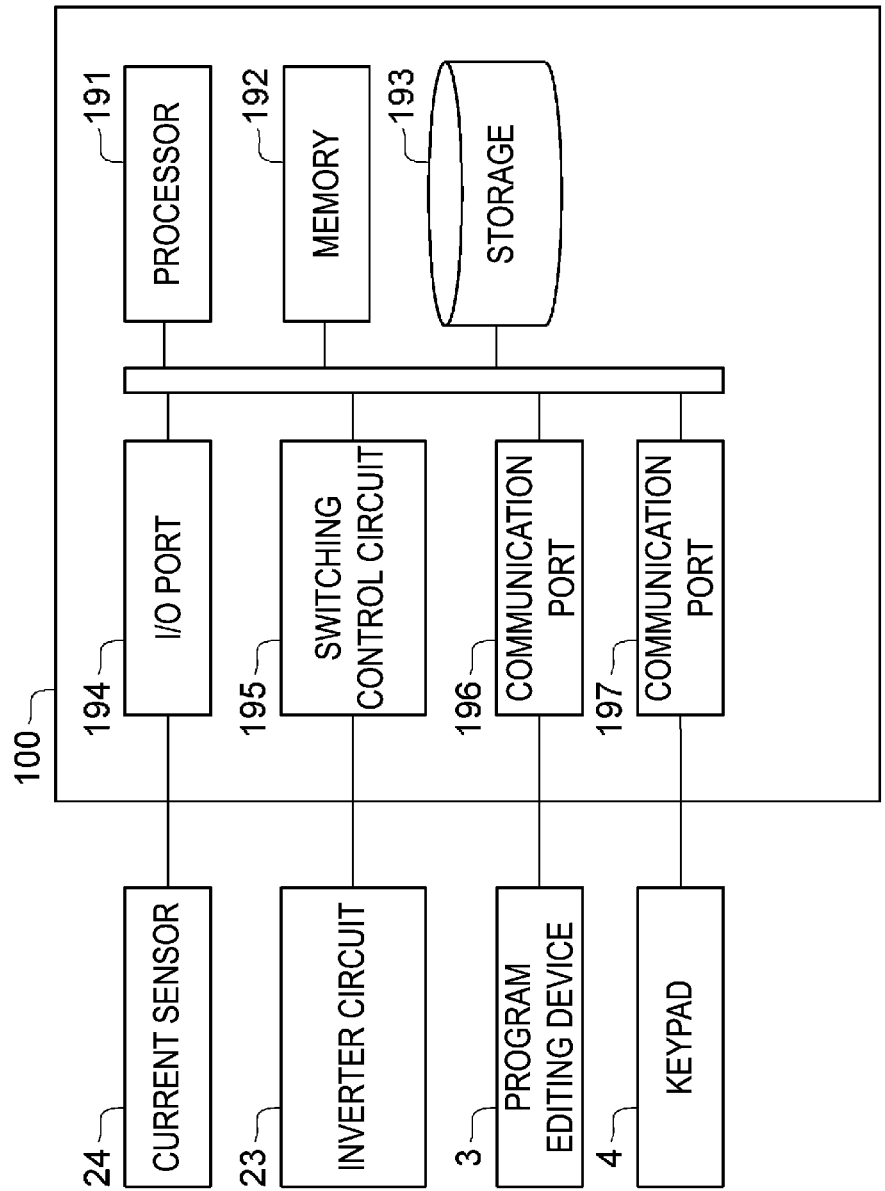
FIG. 11 is a schematic diagram illustrating an example of a hardware configuration of a control circuit.

FIG. 11 is a schematic diagram illustrating an example of a hardware configuration of the control circuit 100. As illustrated in FIG. 11, the control circuit 100 includes one or a plurality of processors 191, a memory 192, a storage 193, an I/O port 194, a switching control circuit 195, a communication port 196, and a communication port 197. The storage 193 includes a storage medium that can be read by a computer, such as a non-volatile semiconductor memory. The storage 193 stores a program that causes the control circuit 100 to execute a control method including: acquiring, among a plurality of program modules stored in the program storage unit 120, an extension program that determines a content of an extension module having an undetermined content, and causing the extension program storage unit 114 to store the extension program; sequentially calling and executing two or more execution target modules from the plurality of program modules, based on sequence data stored in the program storage unit 120, and controlling the power conversion circuit 20, based on an execution result; and when a called execution target module is the extension module, including the extension program of the extension program storage unit 114 into the extension module and executing the extension program. For example, the storage 193 stores a program for implementing each functional unit described above in the control circuit 100.

The memory 192 temporarily stores the program loaded from the storage medium of the storage 193 and the calculation result from each of the plurality of processors 191. The processor 191 implements each functional unit of the control circuit 100 by executing the program described above in cooperation with the memory 192. The I/O port 194 inputs and outputs electric signals to and from the current sensor 24, in accordance with a command from the processor 191. The switching control circuit 195 switches on and off the plurality of switching elements 25 in the inverter circuit 23, in accordance with a command from the processor 191, to output the above-described driving power to the load 92. The communication port 196 communicates information with the program editing device 3, in accordance with a command from the processor 191. The communication port 197 communicates information with the keypad 4, in accordance with a command from the processor 191.

The control circuit 100 is not necessarily limited to a control circuit that implements each function by a program. For example, the control circuit 100 may configure at least some functions with a dedicated logic circuit or an application specific integrated circuit (ASIC) integrating the logic circuit.

The program editing device 3 may include a plurality of computers that can communicate with each other. For example, the program editing device 3 may include a first editing computer that generates sequence data and an extension program, and a second editing computer that transmits the sequence data and the extension program generated by the first editing computer to the control circuit 100. The first editing computer may be provided in a remote location from the second editing computer and may be configured to communicate with the second editing computer via a wide area network such as the Internet. The first editing computer may have a function of generating an extension program, and the second editing computer may have a function of generating sequence data. The first editing computer may have a function of generating both the sequence data and the extension program, and the second editing computer may further have a function of generating the sequence data.

Control Procedure

Next, as an example of a power conversion method, an example of a power conversion procedure executed by the power conversion system 1 will be described. This procedure includes: acquiring, among a plurality of program modules stored in the module storage unit 122, an extension program that determines a content of an extension module having an undetermined content, and causing the extension program storage unit 114 to store the extension program; and sequentially calling and executing two or more execution target modules from the plurality of program modules, based on sequence data stored in the sequence storage unit 121, and controlling the power conversion circuit 20, based on an execution result. When a called execution target module is the extension module, the extension program of the extension program storage unit 114 is included into the extension module and executed. Hereinafter, a power conversion procedure executed by the power conversion system 1 is divided into a procedure of generating an extension program and sequence data by the program editing device 3, a procedure of registering the extension program and the sequence data by the control circuit 100, a procedure of registering wizard data by the control circuit 100, a wizard processing procedure by the control circuit 100, and a control procedure by the control circuit 100, with each of the procedures being described in detail.

Procedure of Generating Extension Program and Sequence Data

This procedure includes generating, based on a source code, an extension program that determines a content of an extension module having an undetermined content, among a plurality of program modules stored in the power conversion device 2 (the module storage unit 122), and storing the extension program in the extension program storage unit 114 that the power conversion device 2 refers to when executing the extension module in a process of sequentially executing the plurality of program modules, based on sequence data determined in advance.

This procedure may further include generating sequence data of the plurality of program modules, based on a block diagram in which a plurality of function blocks respectively associated with the plurality of program modules are aligned and connected to each other, and causing the sequence storage unit 121 of the power conversion device 2 to store the sequence data.

Since the power conversion device 2 executing the control desired is completely implemented by these procedures, it can be said that these procedures constitute a part of the method of manufacturing the power conversion device 2. Hereinafter, a procedure of generating the extension program and a procedure of generating the sequence data will be individually described.

Figure 12:
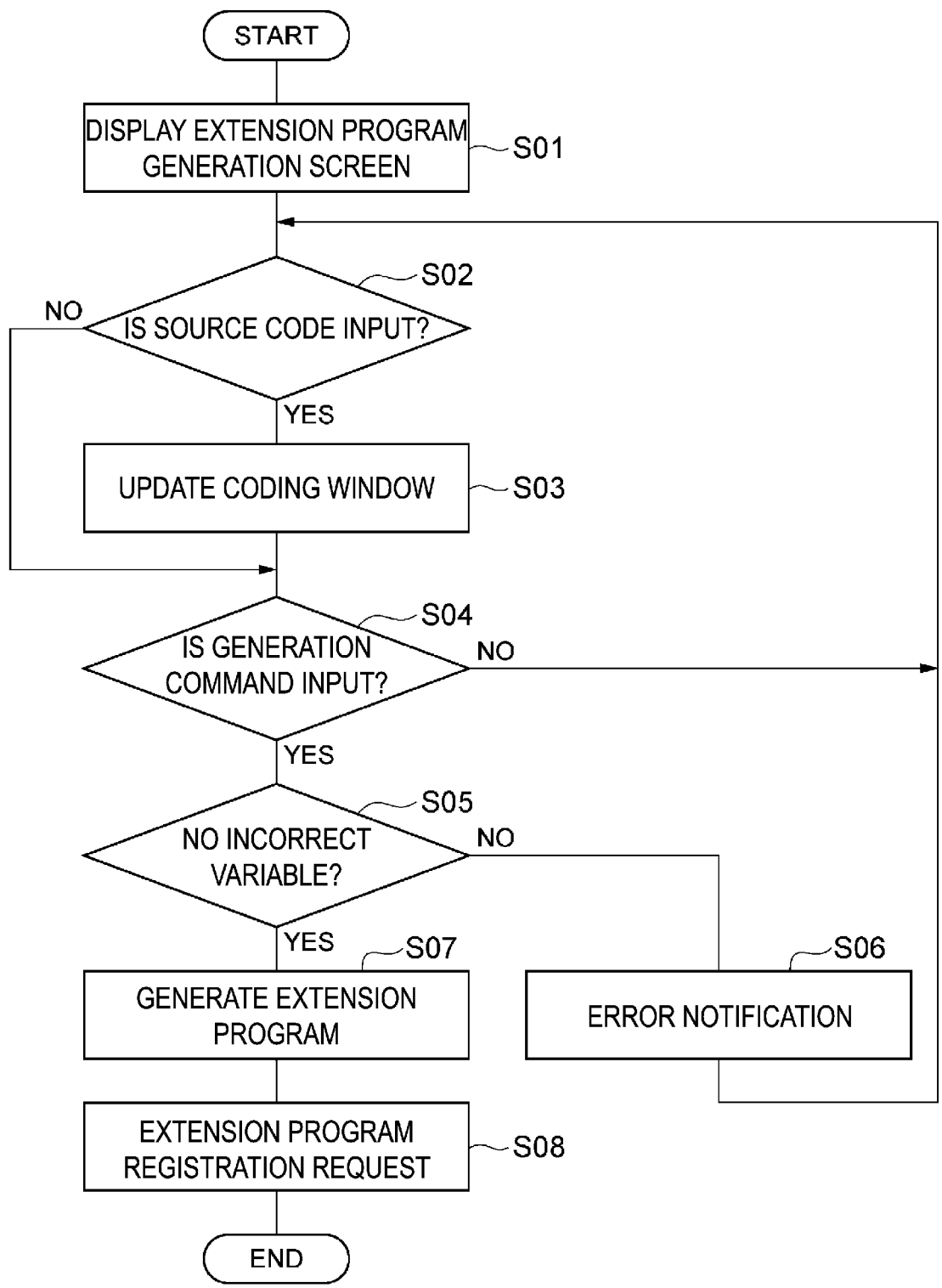
FIG. 12 is a flowchart illustrating an example of a procedure of generating an extension program by a program editing device.

FIG. 12 is a flowchart illustrating an example of a procedure of generating an extension program. As illustrated in FIG. 12, the program editing device 3 first executes steps S01 and S02. Step S01 includes displaying the extension program generation screen 300 on a display device such as a liquid crystal monitor. Step S02 includes confirming whether a source code is input to the coding window 301 by an input device such as a keyboard.

When it is determined in step S02 that a source code is input to the coding window 301, the program editing device 3 executes step S03. Step S03 includes updating a display of the coding window 301 to reflect the input source code.

Next, the program editing device 3 executes step S04. When it is determined in step S02 that the source code is not input to the coding window 301, the program editing device 3 executes step S04 without executing step S03. Step S04 includes confirming whether a command to generate an extension program is input by an operation of the extension program registration button 302.

When it is determined in step S04 that the command to generate the extension program is not input, the program editing device 3 returns the processing to step S02. Afterwards, the display of the coding window 301 is continuously updated in accordance with the input of the source code, until the command to generate the extension program is input.

When it is determined in step S04 that the command to generate the extension program is input, the program editing device 3 executes step S05. Step S05 includes confirming whether the source code displayed by the coding window 301 satisfies the above-described coding rule that includes performing a calculation, based on the above-described input variable, and storing a calculation result in the output variable.

When it is determined in step S05 that the source code does not satisfy the coding rule, the program editing device 3 executes step S06. Step S06 includes displaying, on a display device, an error message indicating that the coding rule mentioned above is not satisfied. The program editing device 3 then returns the processing to step S02.

When it is determined in step S05 that the source code satisfies the coding rule, the program editing device 3 executes steps S07 and S08. Step S07 includes converting the source code of the coding window 301 into the machine language mentioned above, to generate the extension program. Step S08 includes transmitting the generated extension program to the control circuit 100. In response thereto, the extension program acquisition unit 113 acquires the extension program and stores the extension program in the extension program storage unit 114. Therefore, a process of transmitting the generated extension program to the control circuit 100 is an example of a process of causing the extension program storage unit 114 to store the extension program. Thus, the procedure of generating the extension program is completed.

Figure 13:
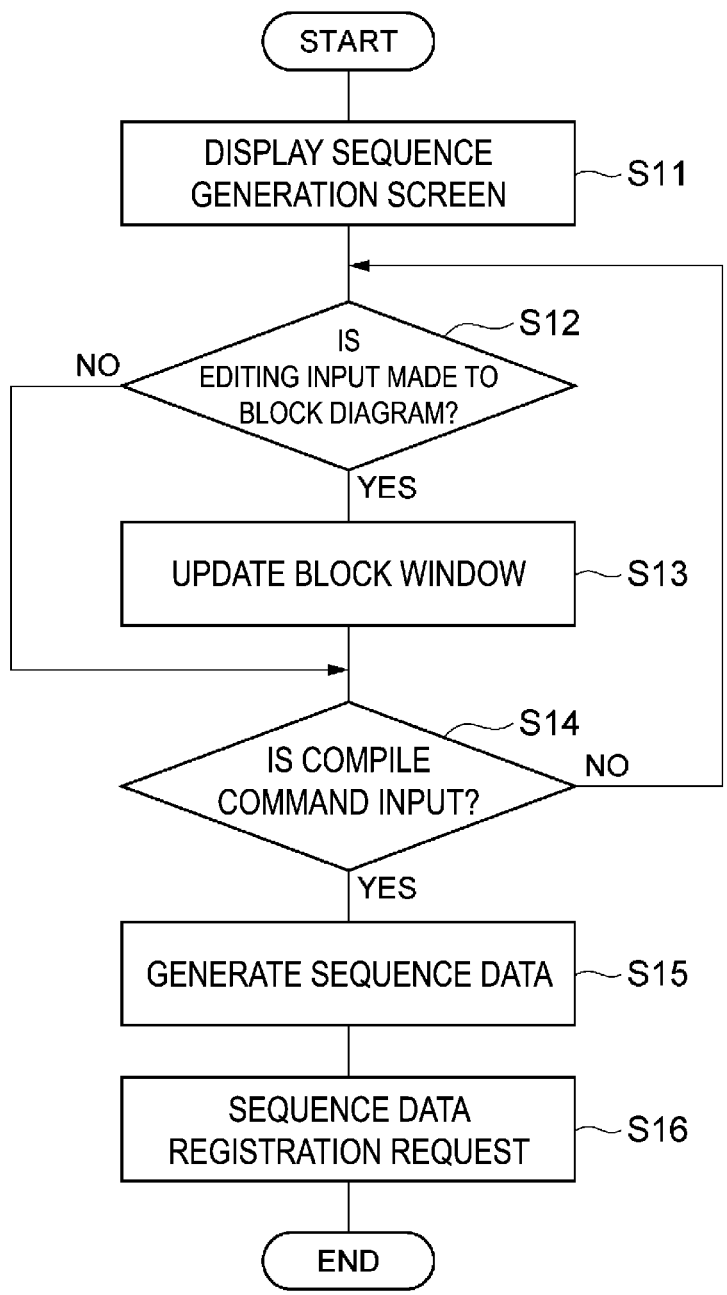
FIG. 13 is a flowchart illustrating an example of a procedure of generating sequence data by the program editing device.

FIG. 13 is a flowchart illustrating an example of a procedure of generating sequence data. As illustrated in FIG. 13, the program editing device 3 first executes steps S11 and S12. Step S11 includes displaying the sequence generation screen 200 on a display device such as a liquid crystal monitor. Step S12 includes confirming whether an editing input is made to the block diagram of the block window 201 by an input device such as a keyboard. Specific examples of the editing input include adding a function block, moving a function block, and connecting function blocks (connecting an output terminal and an input terminal).

When it is determined in step S12 that an editing input is made to the block diagram, the program editing device 3 executes step S13. Step S13 includes updating the display of the block window 201 to reflect the editing input in the block diagram.

Next, the program editing device 3 executes step S14. When it is determined in step S12 that no editing input is made to the block diagram, the program editing device 3 executes step S14 without executing step S13. Step S14 includes confirming whether a command to generate sequence data is input by an operation of the sequence registration button 202.

When it is determined in step S14 that the command to generate the sequence data is not input, the program editing device 3 returns the processing to step S12. Afterwards, the display of the block window 201 is continuously updated in accordance with the editing input of the block diagram, until the command to generate the sequence data is input.

When it is determined in step S14 that the command to generate the sequence data is input, the program editing device 3 executes steps S15 and S16. Step S15 includes generating sequence data, based on the block diagram of the block window 201. Step S16 includes transmitting the generated sequence data to the control circuit 100. In response thereto, the sequence acquisition unit 112 acquires the sequence data and stores the sequence data in the sequence storage unit 121. Therefore, a process of transmitting the generated sequence data to the control circuit 100 is an example of a process of storing the sequence data in the sequence storage unit 121. Thus, the procedure of generating the sequence data is completed.

Procedure of Registering Extension Program and Sequence Data

Figure 14:
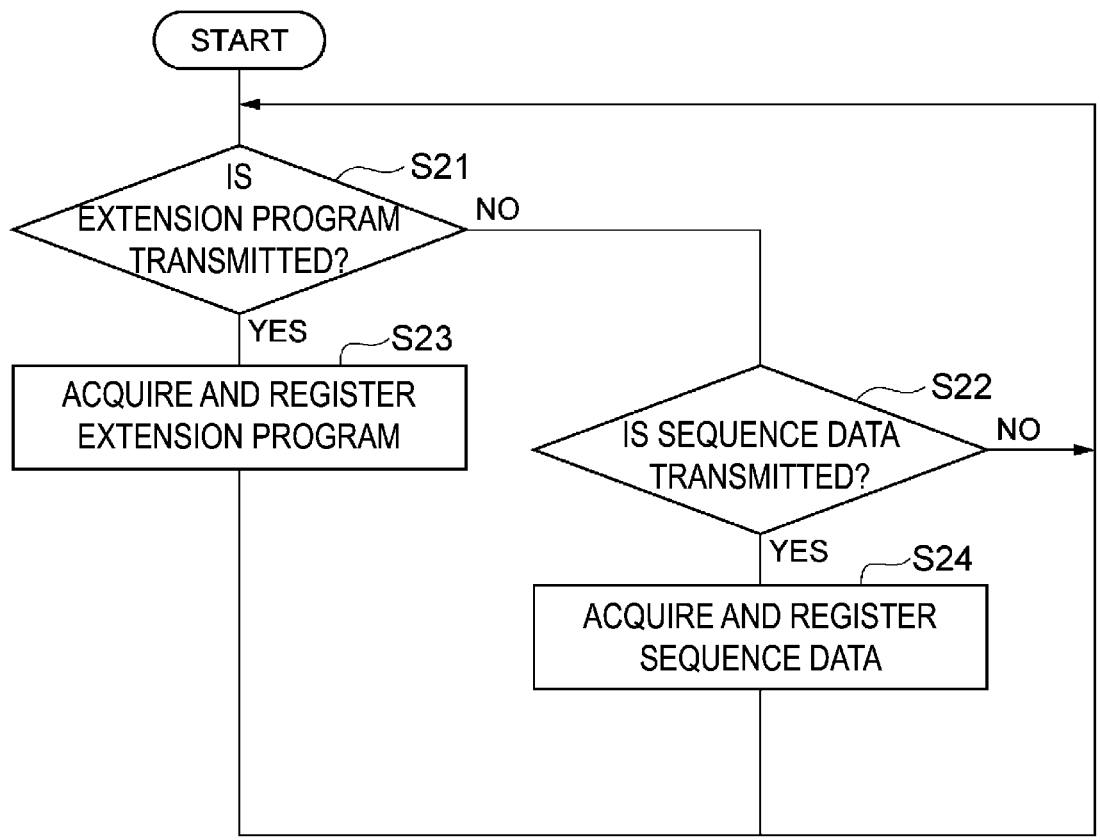
FIG. 14 is a flowchart illustrating an example of a procedure of acquiring the sequence data and the extension program by the power conversion device.

FIG. 14 is a flowchart illustrating an example of a procedure of registering an extension program and sequence data by the control circuit 100. As illustrated in FIG. 14, the control circuit 100 first executes step S21. In step S21, the extension program acquisition unit 113 confirms whether the extension program is transmitted from the program editing device 3.

When it is determined in step S21 that the extension program is not transmitted, the control circuit 100 executes step S22. In step S22, the sequence acquisition unit 112 confirms whether the sequence data is transmitted from the program editing device 3.

When it is determined in step S22 that the sequence data is not transmitted, the control circuit 100 returns the processing to step S21. Thereafter, the control circuit 100 waits for the extension program or the sequence data to be transmitted from the program editing device 3.

When it is determined in step S21 that the extension program is transmitted, the control circuit 100 executes step S23. In step S23, the extension program acquisition unit 113 acquires the extension program transmitted from the program editing device 3 and causes the extension program storage unit 114 to store the extension program.

When it is determined in step S22 that the sequence data is transmitted, the control circuit 100 executes step S24. In step S24, the sequence acquisition unit 112 acquires the sequence data transmitted from the program editing device 3 and stores the sequence data in the sequence storage unit 121.

After executing step S23 or step S24, the control circuit 100 returns the processing to step S21. The control circuit 100 repeatedly executes the processing described above.

Procedure of Registering Wizard Data

Figure 15:
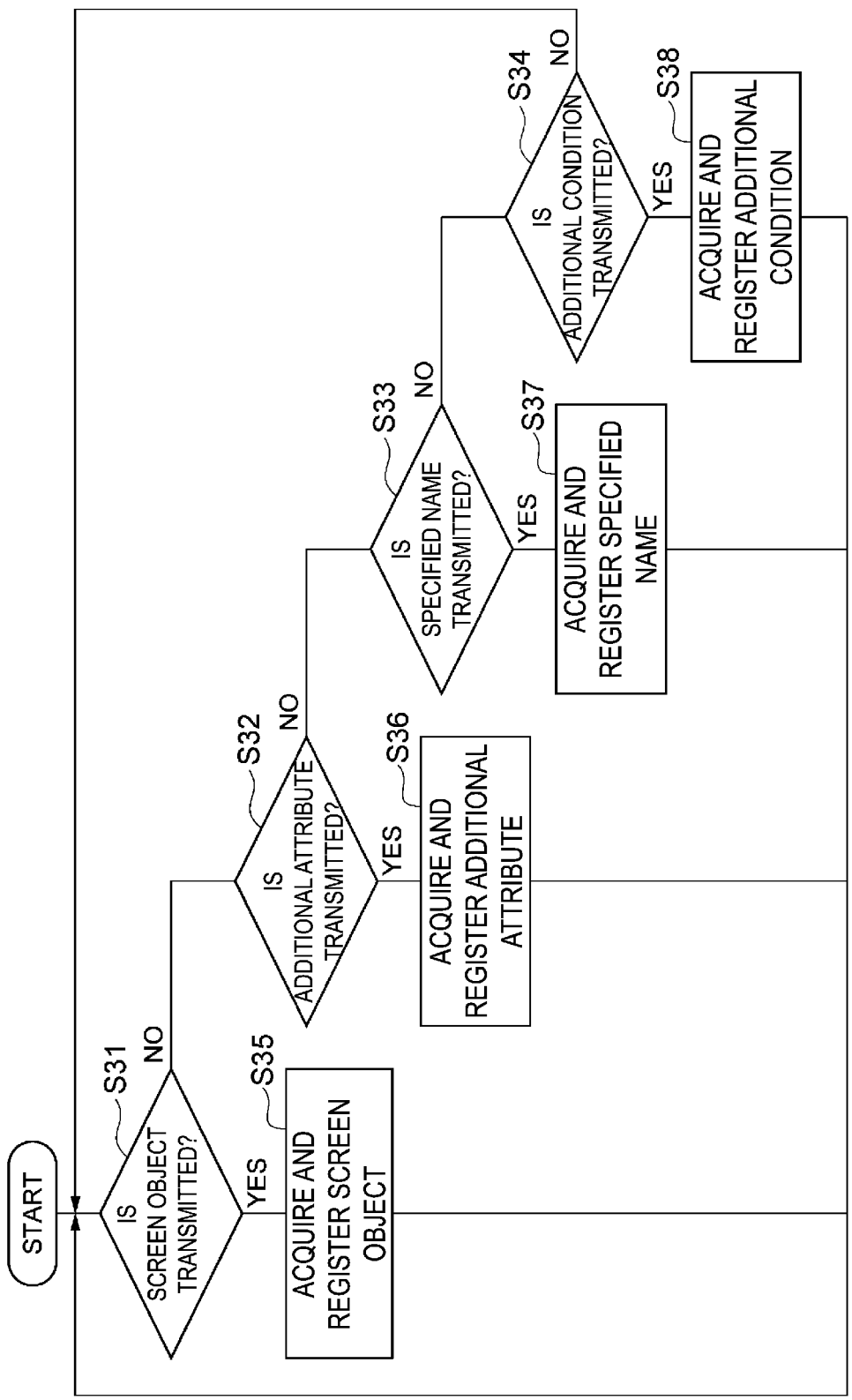
FIG. 15 is a flowchart illustrating an example of a procedure of acquiring wizard data by the power conversion device.

FIG. 15 is a flowchart illustrating an example of a procedure of registering wizard data by the control circuit 100. As illustrated in FIG. 15, the control circuit 100 first executes step S31. In step S31, the screen object acquisition unit 131 confirms whether the above-described screen object is transmitted from the program editing device 3.

When it is determined in step S31 that the screen object is not transmitted, the control circuit 100 executes step S32. In step S32, the additional attribute acquisition unit 152 confirms whether the above-described attribute specification data is transmitted from the program editing device 3.

When it is determined in step S32 that the attribute specification data is not transmitted, the control circuit 100 executes step S33. In step S33, the specified name acquisition unit 142 confirms whether the above-described name specification data is transmitted from the program editing device 3.

When it is determined in step S33 that the name specification data is not transmitted, the control circuit 100 executes step S34. In step S34, the additional condition acquisition unit 162 confirms whether the above-described input condition specification data is transmitted from the program editing device 3.

When it is determined in step S34 that the input condition specification data is not transmitted, the control circuit 100 returns the processing to step S31. Afterwards, the control circuit 100 waits for a screen object, attribute specification data, name specification data, or input condition specification data to be transmitted from the program editing device 3.

When it is determined in step S31 that the screen object is transmitted, the control circuit 100 executes step S35. In step S35, the screen object acquisition unit 131 acquires a screen object and causes the screen object storage unit 132 to store the screen object.

When it is determined in step S32 that the attribute specification data is transmitted, the control circuit 100 executes step S36. In step S36, the additional attribute acquisition unit 152 acquires the attribute specification data and causes the additional attribute storage unit 153 to store the attribute specification data.

When it is determined in step S33 that the name specification data is transmitted, the control circuit 100 executes step S37. In step S37, the specified name acquisition unit 142 acquires name specification data and causes the specified name storage unit 143 to store the name specification data.

When it is determined in step S34 that the input condition specification data is transmitted, the control circuit 100 executes step S38. In step S38, the additional condition acquisition unit 162 acquires input condition specification data and causes the additional condition storage unit 163 to store the input condition specification data.

After executing step S35, step S36, step S37, or step S38, the control circuit 100 returns the processing to step S31. The control circuit 100 repeatedly executes the processing described above.

Wizard Processing Procedure

Figure 16:
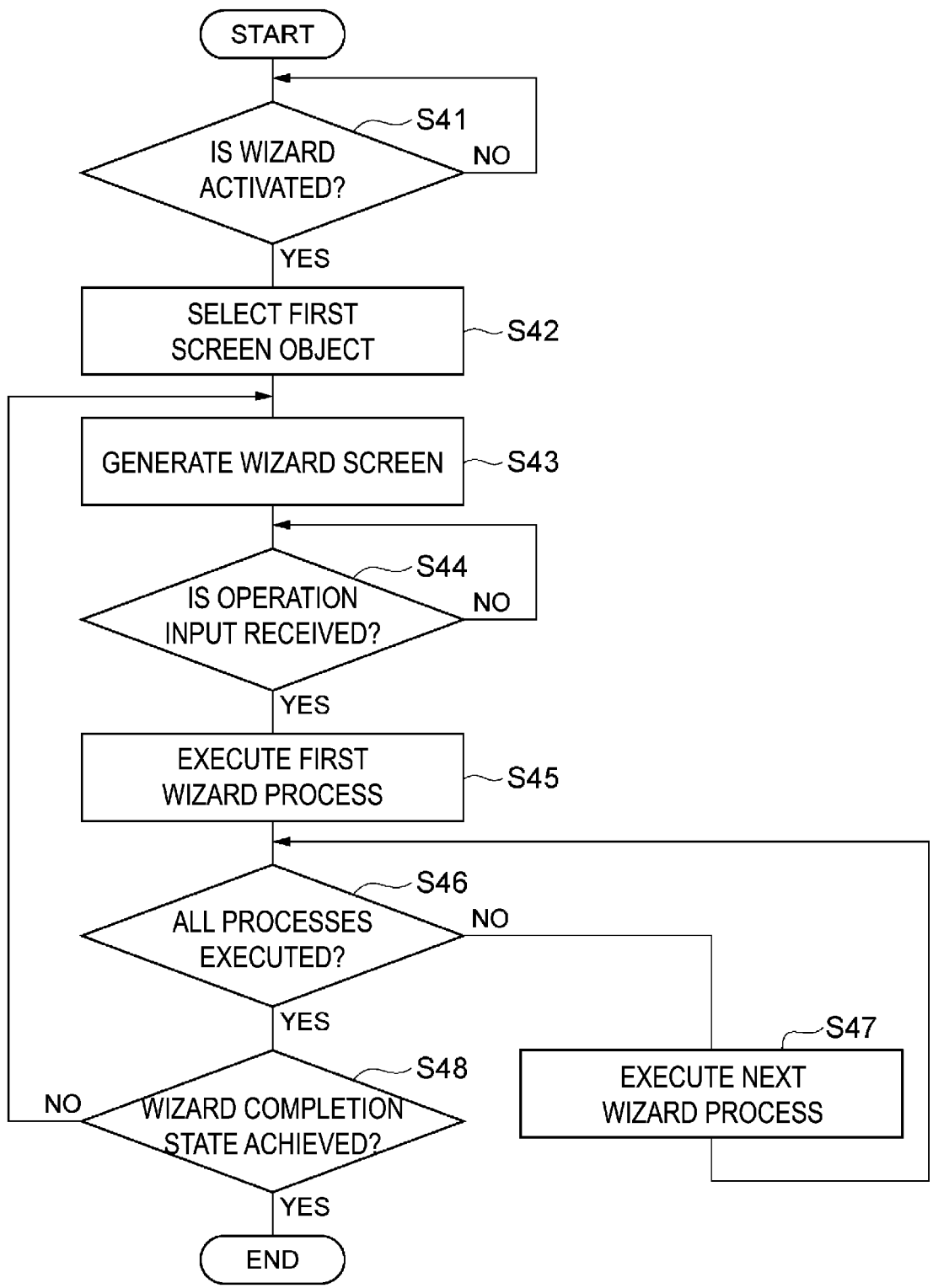
FIG. 16 is a flowchart illustrating an example of an operation guidance procedure by a wizard of the power conversion device.

In this procedure, the control circuit 100 guides an operation input by a user by a dialogue-type wizard, in accordance with wizard data. As illustrated in FIG. 16, the control circuit 100 first executes steps S41, S42, S43, S44, S45, and S46.

In step S41, the wizard execution unit 133 waits for a wizard activation command to be input to the keypad 4. In step S42, the wizard execution unit 133 selects, based on the initial selection condition mentioned above, a screen object to be displayed first from the plurality of screen objects in the screen object storage unit 132. In step S43, the wizard execution unit 133 generates a wizard screen, based on the screen object to be displayed. In step S44, the wizard execution unit 133 waits for an operation input (hereinafter referred to as a "trigger input") that serves as a trigger for a process.

In step S45, the wizard execution unit 133 executes a first wizard process among one or more wizard processes associated with the trigger input in the screen object to be displayed. In step S46, the wizard execution unit 133 confirms whether all wizard processes are executed.

When it is determined in step S46 that an unexecuted wizard process remains, the control circuit 100 executes step S47. In step S47, the wizard execution unit 133 executes the next wizard process associated with the above-described trigger input. Subsequently, the control circuit 100 returns the processing to step S46. Afterwards, the one or more wizard processes associated with the above-described trigger input are sequentially executed until all the wizard processes are completed.

When the wizard process is a screen transition process other than the last screen transition process mentioned above, the wizard execution unit 133 selects a transition destination screen object, based on the above-described screen transition specification data.

When it is determined in step S46 that all wizard processes are executed, the control circuit 100 executes step S48. In step S48, the wizard execution unit 133 confirms whether a wizard completion state having no transition destination screen object is achieved. For example, when the transition destination screen object is selected by a screen transition destination process, the wizard execution unit 133 determines that the wizard completion state is not achieved, and the control circuit 100 returns the processing to step S43. Thus, in step S43, a wizard screen based on the transition destination screen object is generated. Thereafter, the transition of the wizard screen and the wizard process of the wizard screen in each screen are repeatedly performed, until it is determined in step S48 that the wizard completion state is achieved.

When it is determined in step S48 that the wizard completion state is achieved, the wizard execution unit 133 completes the guidance of the operation input by the wizard.

Control Procedure

This procedure includes sequentially calling and executing two or more execution target modules from the plurality of program modules in the module storage unit 122, based on sequence data stored in the sequence storage unit 121, and controlling the power conversion circuit 20, based on an execution result.

Figure 17:
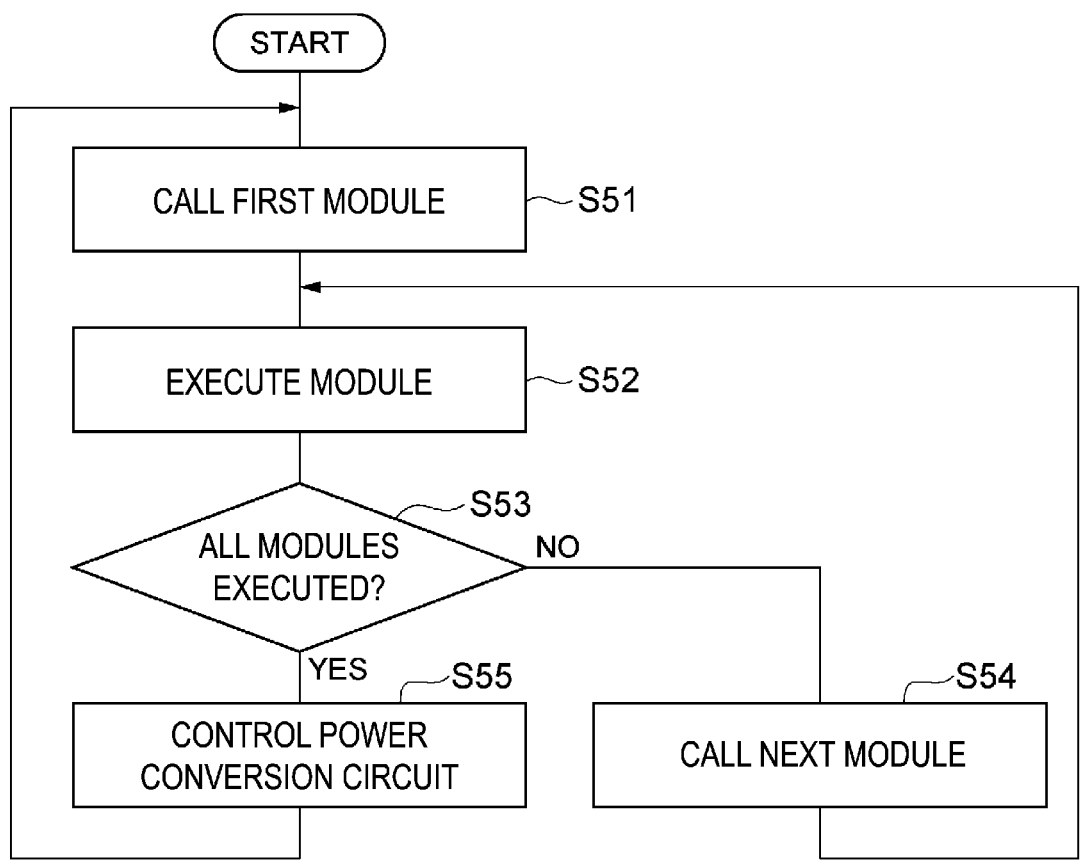
FIG. 17 is a flowchart illustrating an example of a control procedure by the power conversion device.

As illustrated in FIG. 17, the control circuit 100 first executes steps S51, S52, and S53. In step S51, the control unit 118 calls a first execution target module from the plurality of program modules in the module storage unit 122, based on the sequence data in the sequence storage unit 121. In step S52, the control unit 118 executes the execution target module. In step S53, the control unit 118 confirms whether execution of all the program modules included in the sequence data is completed.

When it is determined in step S53 that an unexecuted program module remains, the control circuit 100 executes step S54. In step S54, the control unit 118 calls the next execution target module from the plurality of program modules in the module storage unit 122, based on the sequence data in the sequence storage unit 121. Subsequently, the control circuit 100 returns the processing to step S52. Thereafter, the execution target module is repeatedly called and executed until execution of all the program modules included in the sequence data is completed.

When a called execution target module is the extension module, the control unit 118 includes the extension program of the extension program storage unit 114 into the extension module and executes the extension program. When a called execution target module is the extension input module, the control unit 118 acquires input data and stores the input data in the input variable of the input variable storage unit 115. For example, the control unit 118 acquires an execution result of the output standard module executed immediately before the acquisition and stores the execution result in the input variable of the input variable storage unit 115. When a called execution target module is the extension module, the control unit 118 executes the extension program, based on the input variable of the input variable storage unit 115. Furthermore, the control unit 118 stores, in the output variable of the output variable storage unit 116, output data obtained by executing the extension program. When a called execution target module is the extension output module, the control unit 118 reads the output variable of the output variable storage unit 116, and causes the input standard module that is executed immediately after the output variable is read, to acquire the read output variable.

When it is determined in step S53 that execution of all program modules is completed, the control circuit 100 executes step S55. In step S55, the control unit 118 controls the power conversion circuit 20, based on a series of execution results of all the program modules included in the sequence data. For example, the control unit 118 executes all program modules to generate a voltage command, and outputs the generated voltage command to the PWM control unit 111. Thus, the power conversion circuit 20 is controlled based on a series of execution results. Subsequently, the control circuit 100 returns the processing to step S51. The control circuit 100 repeats the procedure described above at a predetermined control period.

Effects of the Present Embodiment

As described above, the power conversion device 2 includes the power conversion circuit that converts primary power into secondary power, the program storage unit 120 that stores a plurality of program modules and sequence data, the extension program acquisition unit 113 that acquires an extension program and causes the extension program storage unit 114 to store the extension program, and the control unit 118 that sequentially calls and executes two or more execution target modules from the plurality of program modules, based on the sequence data, and controls the power conversion circuit 20, based on an execution result. The plurality of program modules include an extension module, and when a called execution target module is the extension module, the control unit 118 includes the extension program of the extension program storage unit 114 into the extension module and executes the extension program.

According to the present power conversion device 2, an execution target program is sequentially called and executed from the plurality of program modules in accordance with the sequence data, and when the extension module is called, the extension program in the extension program storage unit 114 is executed as part of the extension module. Therefore, by determining the sequence of existing program modules, it is possible to easily incorporate a partially coded extension program into an easily constructible overall program. Therefore, the present power conversion device 2 is effective in achieving both easy programming and improved extensibility of the device.

The power conversion device 2 may further include the input variable storage unit 115 that stores an input variable. The plurality of program modules may further include an extension input module. When a called execution target module is the extension input module, the control unit 118 may acquire input data and store the input data in the input variable of the input variable storage unit 115. When a called execution target module is the extension module, the control unit 118 may execute the extension program, based on the input variable of the input variable storage unit 115. In this case, by using modules separate from the extension module in the process of delivering the input data to the extension program, the entire program can be easily adapted to the number, the type, and the like of the input data required by the extension program.

The power conversion device 2 may further include the output variable storage unit 116 that stores an output variable. The plurality of program modules may further include an extension output module. When a called execution target module is the extension module, the control unit 118 may store, in the output variable of the output variable storage unit 116, output data obtained by executing the extension program. When a called execution target module is the extension output module, the control unit 118 may read the output variable of the output variable storage unit 116. In this case, by using modules separate from the extension module in the process of acquiring the output data obtained by executing the extension program, the entire program can be easily adapted to the number, the type, and the like of the output data of the extension program.

The power conversion device 2 may further include the screen object acquisition unit 131 that acquires a plurality of screen objects determining each of a display content of a wizard screen for guiding an operation input and a processing content corresponding to an operation input in accordance with a guidance, and causes the screen object storage unit 132 to store the plurality of screen objects, and the wizard execution unit 133 that selects a screen object to be displayed from the plurality of screen objects in the screen object storage unit, based on an actual operation input, and displays a wizard screen, based on the screen object to be displayed.

A user operation procedure required for initial setting, troubleshooting, or the like of the power conversion device 2 may vary depending on the content of the entire program. When the user operation procedure changes, it is necessary to change a content of the wizard for guiding the operation input. In response, the content of the wizard can be easily changed according to a configuration in which a plurality of screen objects including each of a display content of a wizard screen and a processing content corresponding to an operation input are acquired and stored in the screen object storage unit 132, a screen object to be displayed is selected from the plurality of screen objects in the screen object storage unit 132, and the wizard screen is displayed, based on the screen object to be displayed.

The power conversion device 2 may further include the base screen storage unit 134 that stores a base screen, and the wizard execution unit 133 may create, in the base screen in the base screen storage unit, a display content based on the screen object to be displayed, to display the wizard screen. In this case, by preparing the base screen in advance, only the content to be created in the base screen needs to be included in the screen object, so that the screen object has a simple content. Therefore, the content of the wizard can be changed more easily.

The base screen storage unit 134 may store a plurality of base screens including the base screen. Each of the plurality of screen objects may include base specification data specifying any one of the plurality of base screens and content data specifying a content to be created in the specified base screen. The wizard execution unit 133 may select any one of the plurality of base screens, based on the base specification data of the screen object to be displayed, and create, in a selected base screen, a display content specified by the content data of the screen object to be displayed, to display a wizard screen. In this case, by making it possible to select a plurality of base screens, both the content of the wizard can be changed easily and more diverse operation guidance can be provided.

Each of the plurality of base screens may include a message region for displaying a message to the user. The content data of each of the plurality of screen objects may include message data determining the message to the user. The wizard execution unit 133 may create, in the message region of the selected base screen, a message determined by the message data of the screen object to be displayed, to display the wizard screen. In this case, by setting a screen including a message to a user as the basic type of wizard screen, it is both possible to easily change the content of the wizard and to achieve reliable operation guidance.

The power conversion device 2 may further include the parameter storage unit 119 that stores one or more control parameters. The control unit 118 may control the power conversion circuit 20, further based on the one or more control parameters stored in the parameter storage unit 119. The plurality of base screens may include a parameter setting screen further including a parameter setting region. The plurality of screen objects may include a parameter setting object. The base specification data of the parameter setting object may specify the parameter setting screen. The content data of the parameter setting object may include parameter specification data specifying any one of the one or more control parameters. When the screen object to be displayed is the parameter setting object, the wizard execution unit 133 may select the parameter setting screen, based on the base specification data, and create, in the parameter setting region, a setting portion of the control parameter specified by the parameter specification data, to display the wizard screen. In this case, a wizard screen for setting a parameter can be easily generated by a simple information input that specifies a parameter setting screen and a control parameter to be set.

The power conversion device 2 may further include the parameter name storage unit 141 that stores an initial name of the one or more control parameters, and the specified name acquisition unit 142 that acquires name specification data specifying a user-specified name in any one of the one or more control parameters, and causes a specified name storage unit 143 to store the name specification data. When the name specification data for the control parameter specified by the parameter specification data is stored in the specified name storage unit 143, the wizard execution unit 133 may create the user-specified name in the parameter setting region, and when the name specification data for the control parameter is not stored in the specified name storage unit 143, the wizard execution unit 133 may create the initial name in the parameter setting region. In this case, by flexibly changing a parameter name in the parameter setting region, it is possible to easily generate a wizard screen for prompting more accurate parameter input.

The one or more control parameters may include a fixed attribute parameter having an attribute that is unchangeable, and a free parameter having an attribute that is changeable. The power conversion device 2 may further include the fixed attribute storage unit 151 that stores an attribute of the fixed attribute parameter, and the additional attribute acquisition unit 152 that acquires attribute specification data specifying an attribute of the free parameter and causes the additional attribute storage unit 153 to store the attribute specification data. When a control parameter specified by the parameter specification data is the fixed attribute parameter, the wizard execution unit 133 may create, in the parameter setting region, a display of the attribute stored in the fixed attribute storage unit 151. When a control parameter specified by the parameter specification data is the free parameter, the wizard execution unit 133 may create, in the parameter setting region, a display of the attribute stored in the additional attribute storage unit 153. In this case, it is possible to clearly indicate an attribute in the parameter setting region for both the fixed attribute parameter and the free parameter, to generate a wizard screen for prompting more accurate parameter input.

The plurality of base screens may include a menu selection screen including a menu selection region. The plurality of screen objects may include a menu selection object. The base specification data of the menu selection object may specify the menu selection screen. The content data of the menu selection object may include item data determining one or more items to be displayed to the user as options. When the screen object to be displayed is the menu selection object, the wizard execution unit 133 may select the menu selection screen, based on the base specification data, and may create, in the menu selection region, the one or more items specified by the item data, to display the wizard screen. In this case, an item selection type wizard screen can be easily added by a simple information input for specifying an item. Thus, the content of the wizard can be changed more easily and more diverse operation guidance can be provided.

The power conversion device 2 may further include the wizard process storage unit 135 that stores one or more wizard processes. At least any one of the plurality of screen objects may further include process specification data in which the operation input in accordance with the guidance is associated with at least one wizard process stored in the wizard process storage unit 135. When the screen object to be displayed includes the process specification data, the wizard execution unit 133 may execute any one of the one or more wizard processes, based on the actual operation input and the process specification data. In this case, the wizard process can be easily provided at any position in a transition scenario of the wizard screen. Therefore, it is possible to easily generate a wizard for executing a desired process in accordance with the scenario.

The one or more wizard processes may include a screen transition process of causing a current wizard screen to transition to a wizard screen based on any one of the plurality of screen objects. At least one of the plurality of screen objects may include, as the process specification data, screen transition specification data in which the operation input in accordance with the guidance is associated with the screen transition process. When the screen object to be displayed includes the screen transition specification data, the wizard execution unit 133 may execute the screen transition process, based on the actual operation input and the screen transition specification data. In this case, it is possible to easily provide a branching in accordance with the operation input, at any position in the scenario. Therefore, it is possible to easily generate a wizard in which a scenario branches in accordance with the operation input.

The power conversion device 2 may further include the wizard process storage unit 135 that stores a parameter change process changing the control parameter, based on a content input to the setting portion of the control parameter in the parameter setting region. The parameter setting object may include change process specification data in which the operation input in accordance with the guidance is associated with the parameter change process. When the screen object to be displayed is the parameter setting object, the wizard execution unit may execute the parameter change process, based on the actual operation input and the change process specification data. In this case, it is possible to easily generate a wizard for changing the control parameter, based on the content input to the setting portion for the control parameter in the parameter setting region.

The power conversion device 2 may further include the wizard process storage unit 135 that stores one or more wizard processes. The menu selection object may further include item correspondence data associating the one or more items with any one of the one or more wizard processes. When the screen object to be displayed is the menu selection object, the wizard execution unit 133 may execute any one of the one or more wizard processes, based on an item selected in the menu selection region and the item correspondence data. In this case, it is possible to easily generate a wizard for changing the processing content according to the selected item.

As described above, the present disclosure is not necessarily limited to the above described embodiments, and various modifications can be made without departing from the gist of the disclosure.

REFERENCE SIGNS LIST

2 . . . Power conversion device
20 . . . Power conversion circuit
113 . . . Extension program acquisition unit
114 . . . Extension program storage unit
115 . . . Input variable storage unit
116 . . . Output variable storage unit
118 . . . Control unit
119 . . . Parameter storage unit
120 . . . Program storage unit 131 . . . Screen object acquisition unit
132 . . . Screen object storage unit
133 . . . Wizard execution unit
134 . . . Base screen storage unit
135 . . . Wizard process storage unit
141 . . . Parameter name storage unit
142 . . . Specified name acquisition unit
143 . . . Specified name storage unit
151 . . . Fixed attribute storage unit
152 . . . Additional attribute acquisition unit
153 . . . Additional attribute storage unit
412, 422, 432 . . . Message data
413, 423, 433 . . . Content data
416, 428 . . . Screen transition specification data
417, 429, 438 . . . Base specification data
420 . . . Parameter setting object
424 . . . Parameter specification data
427 . . . Change process specification data
430 . . . Menu selection object
434 . . . Item data
437 . . . Item correspondence data
511, 521, 531 . . . Message region
520 . . . Parameter setting screen
522 . . . Parameter setting region
530 . . . Menu selection screen
532 . . . Menu selection region

The invention claimed is:

1. A power conversion device, comprising:
a power conversion circuit configured to convert primary power into secondary power;
a program storage unit configured to store a plurality of program modules and sequence data;
an extension program acquisition unit configured to acquire an extension program that determines a content of an extension module having an undetermined content and cause an extension program storage unit to store the extension program; and
a control unit configured to sequentially call and execute two or more execution target modules from the plurality of program modules, based on the sequence data, and control the power conversion circuit, based on an execution result, wherein
the plurality of program modules includes the extension module, and
when an execution target module being called is the extension module, the control unit includes the extension program of the extension program storage unit into the extension module and executes the extension program.

2. The power conversion device according to claim 1, further comprising:
an input variable storage unit configured to store an input variable, wherein
the plurality of program modules further includes an extension input module, and
the control unit is configured to:
when an execution target module being called is the extension input module, acquire input data and store the input data in the input variable of the input variable storage unit, and
when an execution target module being called is the extension module, execute the extension program, based on the input variable of the input variable storage unit.

3. The power conversion device according to claim 1, further comprising:
an output variable storage unit configured to store an output variable, wherein
the plurality of program modules further includes an extension output module, and
the control unit is configured to:
when an execution target module being called is the extension module, store, in the output variable of the output variable storage unit, output data obtained by executing the extension program, and
when an execution target module being called is the extension output module, read the output variable of the output variable storage unit.

4. The power conversion device according to claim 1, further comprising:
a screen object acquisition unit configured to acquire a plurality of screen objects determining each of a display content of a wizard screen for guiding an operation input and a processing content corresponding to an operation input in accordance with a guidance, and cause a screen object storage unit to store the plurality of screen objects; and
a wizard execution unit configured to select a screen object to be displayed from the plurality of screen objects in the screen object storage unit, based on an actual operation input, and display a wizard screen, based on the screen object to be displayed.

5. The power conversion device according to claim 4, further comprising:
a base screen storage unit configured to store a base screen, wherein
the wizard execution unit creates, in the base screen of the base screen storage unit, a display content based on the screen object to be displayed, to display the wizard screen.

6. The power conversion device according to claim 5, wherein
the base screen storage unit stores a plurality of base screens including the base screen,
each of the plurality of screen objects includes base specification data specifying any one of the plurality of base screens and content data specifying a content to be created in a specified base screen, and
the wizard execution unit selects any one of the plurality of base screens, based on the base specification data of the screen object to be displayed, and creates, in a selected base screen, a display content specified by the content data of the screen object to be displayed, to display the wizard screen.

7. The power conversion device according to claim 6, wherein
each of the plurality of base screens includes a message region for displaying a message to a user,
content data of each of the plurality of screen objects includes message data determining the message to the user, and
the wizard execution unit creates, in the message region of the selected base screen, a message determined by the message data of the screen object to be displayed, to display the wizard screen.

8. The power conversion device according to claim 6, further comprising:
a parameter storage unit configured to store one or more control parameters, wherein the control unit controls the power conversion circuit, further based on the one or more control parameters stored in the parameter storage unit, the plurality of base screens includes a parameter setting screen further including a parameter setting region, the plurality of screen objects includes a parameter setting object, the base specification data of the parameter setting object specifies the parameter setting screen, the content data of the parameter setting object includes parameter specification data specifying any one of the one or more control parameters, and when the screen object to be displayed is the parameter setting object, the wizard execution unit selects the parameter setting screen, based on the base specification data, and creates, in the parameter setting region, a setting portion of the control parameter specified by the parameter specification data, to display the wizard screen.

9. The power conversion device according to claim 8, further comprising:

a parameter name storage unit configured to store an initial name of the one or more control parameters; and a specified name acquisition unit configured to acquire name specification data specifying a user-specified name in any one of the one or more control parameters, and cause a specified name storage unit to store the name specification data, wherein when the name specification data for the control parameter specified by the parameter specification data is stored in the specified name storage unit, the wizard execution unit creates the user-specified name in the parameter setting region, and when the name specification data for the control parameter is not stored in the specified name storage unit, the wizard execution unit creates the initial name in the parameter setting region.

10. The power conversion device according to claim 8, wherein the one or more control parameters include a fixed attribute parameter having an attribute that is unchangeable, and a free parameter having an attribute that is changeable, the power conversion device further comprises:

a fixed attribute storage unit configured to store the attribute of the fixed attribute parameter; and an additional attribute acquisition unit configured to acquire attribute specification data specifying the attribute of the free parameter and cause an additional attribute storage unit to store the attribute specification data, and the wizard execution unit is configured to:

when a control parameter specified by the parameter specification data is the fixed attribute parameter, create, in the parameter setting region, a display of the attribute stored in the fixed attribute storage unit; and when a control parameter specified by the parameter specification data is the free parameter, create, in the parameter setting region, a display of the attribute stored in the additional attribute storage unit.

11. The power conversion device according to claim 8, further comprising:

a wizard process storage unit configured to store a parameter change process changing the control parameter, based on a content input to the setting portion of the control parameter in the parameter setting region, wherein the parameter setting object includes change process specification data in which the operation input in accordance with the guidance is associated with the parameter change process, and when the screen object to be displayed is the parameter setting object, the wizard execution unit executes the parameter change process, based on the actual operation input and the change process specification data.

12. The power conversion device according to claim 6, wherein the plurality of base screens include a menu selection screen including a menu selection region, the plurality of screen objects includes a menu selection object, the base specification data of the menu selection object specifies the menu selection screen, the content data of the menu selection object includes item data determining one or more items to be displayed to a user as options, and when the screen object to be displayed is the menu selection object, the wizard execution unit selects the menu selection screen, based on the base specification data, and creates, in the menu selection region, the one or more items specified by the item data, to display the wizard screen.

13. The power conversion device according to claim 12, further comprising:

a wizard process storage unit configured to store one or more wizard processes, wherein the menu selection object further includes item correspondence data associating the one or more items with any one of the one or more wizard processes, and when the screen object to be displayed is the menu selection object, the wizard execution unit executes any one of the one or more wizard processes, based on an item selected in the menu selection region and the item correspondence data.

14. The power conversion device according to claim 4, further comprising:

a wizard process storage unit configured to store one or more wizard processes, wherein at least any one of the plurality of screen objects further includes process specification data in which the operation input in accordance with the guidance is associated with at least any one of the one or more wizard processes, and when the screen object to be displayed includes the process specification data, the wizard execution unit executes any one of the one or more wizard processes, based on the actual operation input and the process specification data.

15. The power conversion device according to claim 14, wherein the one or more wizard processes include a screen transition process of causing a current wizard screen to transition to a wizard screen based on any one of the plurality of screen objects, at least any one of the plurality of screen objects includes, as the process specification data, screen transition specification data in which the operation input in accordance with the guidance is associated with the screen transition process, and when the screen object to be displayed includes the screen transition specification data, the wizard execution unit executes the screen transition process, based on the actual operation input and the screen transition specification data.

16. A power conversion method, comprising:
acquiring, among a plurality of program modules stored in a program storage unit, an extension program that determines a content of an extension module having an undetermined content, and causing an extension program storage unit to store the extension program; and
sequentially calling and executing two or more execution target modules from the plurality of program modules, based on sequence data stored in the program storage unit, and controlling a power conversion circuit, based on an execution result, wherein
when an execution target module being called is the extension module, the extension program of the extension program storage unit is included into the extension module and executed.

17. A method of manufacturing a power conversion device, the method comprising:
generating, based on a source code, an extension program that determines a content of an extension module having an undetermined content, among a plurality of program modules stored in a power conversion device;
generating sequence data of the plurality of program modules, based on a block diagram in which a plurality of function blocks respectively associated with the plurality of program modules are aligned and connected to each other; and
storing the extension program and the sequence data in the power conversion device.

18. A method of manufacturing a power conversion device, the method comprising:
generating, based on a source code, an extension program that determines a content of an extension module having an undetermined content, among a plurality of program modules stored in a power conversion device; and
storing the extension program in an extension program storage unit that the power conversion device refers to when executing the extension module in a process of sequentially executing the plurality of program modules, based on sequence data determined in advance.

* * * * *